(12) United States Patent
Sanghi et al.

(10) Patent No.: US 10,585,699 B2
(45) Date of Patent: Mar. 10, 2020

(54) METHODS AND APPARATUS FOR VERIFYING COMPLETION OF GROUPS OF DATA TRANSACTIONS BETWEEN PROCESSORS

(71) Applicant: Apple Inc., Cupertino, CA (US)

(72) Inventors: Karan Sanghi, San Jose, CA (US); Saurabh Garg, San Jose, CA (US); Vladislav V. Petkov, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/049,624

(22) Filed: Jul. 30, 2018

(65) Prior Publication Data

US 2020/0034186 A1    Jan. 30, 2020

(51) Int. Cl.
*G06F 9/46* (2006.01)
*G06F 9/54* (2006.01)

(52) U.S. Cl.
CPC .............. *G06F 9/467* (2013.01); *G06F 9/544* (2013.01)

(58) Field of Classification Search
CPC ................................. G06F 9/467; G06F 9/544
See application file for complete search history.

(56) References Cited

U.S. PATENT DOCUMENTS

| | | |
|---|---|---|
| 4,805,137 A | 2/1989 | Grant et al. |
| 4,949,299 A | 8/1990 | Pickett |
| 4,987,529 A | 1/1991 | Craft et al. |
| 5,367,688 A | 11/1994 | Croll |
| 5,467,459 A | 11/1995 | Alexander et al. |
| 5,485,578 A | 1/1996 | Sweazey |
| 5,613,086 A | 3/1997 | Frey et al. |

(Continued)

FOREIGN PATENT DOCUMENTS

| | | |
|---|---|---|
| EP | 3013008 A1 | 4/2016 |
| JP | H02306082 A | 12/1990 |

(Continued)

OTHER PUBLICATIONS

ECN L1 PM Substates with CLKREQ approved Aug. 23, 2012.

(Continued)

*Primary Examiner* — Charles E Anya
(74) *Attorney, Agent, or Firm* — Gazdzinski & Associates, PC

(57) ABSTRACT

Methods and apparatus for acknowledging and verifying the completion of data transactions over an inter-processor communication (IPC) link between two (or more) independently operable processors. In one embodiment, a host-side processor delivers payloads over the IPC link using one or more transfer descriptors (TDs) that describe the payloads. The TDs are written in a particular order to a transfer descriptor ring (TR) in a shared memory between the host and peripheral processors. The peripheral reads the TDs over the IPC link and transacts, in proper order, the data retrieved based on the TDs. To acknowledge the transaction, the peripheral processor writes completion descriptors (CDs) to a completion descriptor ring (CR). The CD may complete one or more TDs; in optimized completion schemes the CD completes all outstanding TDs up to and including the expressly completed TD.

20 Claims, 17 Drawing Sheets

(56) References Cited

U.S. PATENT DOCUMENTS

| | | |
|---|---|---|
| 5,659,542 A | 8/1997 | Bell et al. |
| 5,708,779 A | 1/1998 | Graziano et al. |
| 5,731,973 A | 3/1998 | Takaishi et al. |
| 5,850,395 A | 12/1998 | Hauser et al. |
| 5,903,564 A | 5/1999 | Ganmukhi et al. |
| 5,943,507 A | 8/1999 | Cornish et al. |
| 6,008,992 A | 12/1999 | Kawakami |
| 6,216,178 B1 | 4/2001 | Stracovsky et al. |
| 6,233,702 B1 | 5/2001 | Bunton et al. |
| 6,260,152 B1 | 7/2001 | Cole et al. |
| 6,359,863 B1 | 3/2002 | Varma et al. |
| 6,411,997 B1 | 6/2002 | Dawes et al. |
| 6,434,633 B1 | 8/2002 | Braun et al. |
| 6,485,081 B1 | 11/2002 | Bingle et al. |
| 6,523,073 B1 | 2/2003 | Kammer et al. |
| 6,553,446 B1 | 4/2003 | Miller |
| 6,693,895 B1 | 2/2004 | Crummey et al. |
| 6,735,642 B2 | 5/2004 | Kagan et al. |
| 6,815,873 B2 | 11/2004 | Johnson et al. |
| 6,947,442 B1 | 9/2005 | Sato et al. |
| 6,948,094 B2 | 9/2005 | Schultz et al. |
| 6,973,701 B2 | 12/2005 | Momoda et al. |
| 6,990,594 B2 | 1/2006 | Kim et al. |
| 7,013,536 B2 | 3/2006 | Golden et al. |
| 7,032,282 B2 | 4/2006 | Powell et al. |
| 7,100,020 B1 | 8/2006 | Brightman et al. |
| 7,127,600 B2 | 10/2006 | Zimmer et al. |
| 7,191,240 B1 | 3/2007 | Johnson |
| 7,281,172 B2 | 10/2007 | Chujo |
| 7,397,774 B1 | 7/2008 | Holland et al. |
| 7,398,382 B2 | 7/2008 | Rothman et al. |
| 7,506,084 B2 | 3/2009 | Moerti et al. |
| 7,509,391 B1 | 3/2009 | Chauvel et al. |
| 7,587,575 B2 | 9/2009 | Moertl et al. |
| 7,590,817 B2 | 9/2009 | Moertl et al. |
| 7,617,377 B2 | 11/2009 | Moertl et al. |
| 7,681,012 B2 | 3/2010 | Verm et al. |
| 7,685,476 B2 | 3/2010 | Andre et al. |
| 7,802,256 B2 | 9/2010 | Havens et al. |
| 7,853,731 B1 | 12/2010 | Zeng |
| 7,899,941 B2 | 3/2011 | Hendry et al. |
| 7,908,335 B1 | 3/2011 | Citterelle et al. |
| 7,941,682 B2 | 5/2011 | Adams |
| 8,255,725 B2 | 8/2012 | Shimazaki et al. |
| 8,352,624 B2 | 1/2013 | Zimmerman et al. |
| 8,422,404 B2 | 4/2013 | Taki |
| 8,468,285 B2 | 6/2013 | Kobayashi |
| 8,555,099 B2 | 10/2013 | Marinkovic et al. |
| 8,635,412 B1 | 1/2014 | Wilshire |
| 8,656,228 B2 | 2/2014 | Check et al. |
| 8,769,168 B2 | 7/2014 | Moertl et al. |
| 8,788,822 B1 | 7/2014 | Riddle |
| 8,799,537 B1 | 8/2014 | Zhu et al. |
| 8,808,091 B2 | 8/2014 | Shaw et al. |
| 8,819,386 B1 | 8/2014 | Mather |
| 8,832,331 B2 | 9/2014 | Co |
| 8,848,809 B2 | 9/2014 | Whitby-Strevens |
| 8,876,062 B1 | 11/2014 | Baghdasarian |
| 8,914,649 B2 | 12/2014 | So et al. |
| 9,152,580 B1 | 10/2015 | Chau et al. |
| 9,170,957 B2 | 10/2015 | Touzni et al. |
| 9,280,360 B2 | 3/2016 | Xu et al. |
| 9,319,090 B2 | 4/2016 | Whitby-Strevens |
| 9,544,069 B2 | 1/2017 | Whitby-Strevens et al. |
| 9,547,535 B1 | 1/2017 | Wilt |
| 9,568,970 B1 | 2/2017 | Kaushal et al. |
| 9,582,448 B2 | 2/2017 | Saitou |
| 9,594,718 B2 | 3/2017 | Kaushik et al. |
| 9,769,756 B1 | 9/2017 | Cui et al. |
| 9,798,377 B2 | 10/2017 | Sanghi et al. |
| 9,830,289 B2 | 11/2017 | Pulyala et al. |
| 9,910,475 B2 | 3/2018 | Kurts et al. |
| 9,913,305 B2 | 3/2018 | Pinheiro et al. |
| 9,932,757 B2 | 4/2018 | Hager et al. |
| 9,959,124 B1 | 5/2018 | Herbeck et al. |
| 9,971,397 B2 | 5/2018 | Sanghi et al. |
| 1,007,836 A1 | 9/2018 | Sanghi et al. |
| 1,033,161 A1 | 6/2019 | Petkov et al. |
| 2002/0013821 A1* | 1/2002 | Kasper .............. G06F 5/065 709/213 |
| 2002/0013868 A1 | 1/2002 | West |
| 2002/0044553 A1 | 4/2002 | Chakravorty |
| 2002/0065867 A1 | 5/2002 | Chauvel |
| 2002/0169938 A1 | 11/2002 | Scott et al. |
| 2002/0195177 A1 | 12/2002 | Hinkley et al. |
| 2003/0014607 A1 | 1/2003 | Slavin et al. |
| 2003/0086122 A1 | 5/2003 | Parry |
| 2003/0200413 A1 | 10/2003 | Gurumoorthy et al. |
| 2004/0044929 A1 | 3/2004 | Chujo |
| 2004/0064589 A1 | 4/2004 | Boucher et al. |
| 2004/0128568 A1 | 7/2004 | O'Shea |
| 2004/0179546 A1 | 9/2004 | McDaniel et al. |
| 2004/0201749 A1 | 10/2004 | Malloy |
| 2004/0221056 A1 | 11/2004 | Kobayashi |
| 2004/0228365 A1 | 11/2004 | Kobayashi |
| 2005/0076196 A1 | 4/2005 | Zimmer et al. |
| 2005/0108385 A1 | 5/2005 | Wechter et al. |
| 2005/0114620 A1 | 5/2005 | Justen |
| 2005/0117601 A1 | 6/2005 | Anderson et al. |
| 2005/0149711 A1 | 7/2005 | Zimmer et al. |
| 2005/0157781 A1 | 7/2005 | Ho et al. |
| 2005/0198777 A1 | 9/2005 | Mabe |
| 2005/0285862 A1 | 12/2005 | Noda et al. |
| 2006/0039285 A1 | 2/2006 | Chapman et al. |
| 2006/0047989 A1 | 3/2006 | Delgado et al. |
| 2006/0107071 A1 | 5/2006 | Girish et al. |
| 2006/0186700 A1 | 8/2006 | Browne et al. |
| 2006/0186706 A1 | 8/2006 | Browne et al. |
| 2006/0218301 A1 | 9/2006 | O'Toole et al. |
| 2006/0232051 A1 | 10/2006 | Morris et al. |
| 2007/0005869 A1 | 1/2007 | Balraj et al. |
| 2007/0043901 A1 | 2/2007 | Wu et al. |
| 2007/0063540 A1 | 3/2007 | Browne et al. |
| 2007/0063541 A1 | 3/2007 | Browne et al. |
| 2007/0070997 A1 | 3/2007 | Weitz et al. |
| 2007/0080013 A1 | 4/2007 | Melz et al. |
| 2007/0118831 A1 | 5/2007 | Kondo |
| 2007/0180041 A1 | 8/2007 | Suzuoki |
| 2007/0201492 A1 | 8/2007 | Kobayashi |
| 2007/0226417 A1 | 9/2007 | Davis |
| 2007/0261307 A1 | 11/2007 | Alexander et al. |
| 2007/0286246 A1 | 12/2007 | Kobayashi et al. |
| 2008/0007081 A1 | 1/2008 | Shibata et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0100079 A1 | 5/2008 | Herrera et al. |
| 2008/0100092 A1 | 5/2008 | Gao et al. |
| 2008/0120911 A1 | 5/2008 | Browne et al. |
| 2008/0183931 A1 | 7/2008 | Verm et al. |
| 2008/0231711 A1 | 9/2008 | Glen et al. |
| 2008/0235355 A1 | 9/2008 | Spanier et al. |
| 2008/0244259 A1 | 10/2008 | Zimmer et al. |
| 2008/0301148 A1 | 12/2008 | Lee et al. |
| 2009/0024924 A1 | 1/2009 | Kim |
| 2009/0113141 A1 | 4/2009 | Bullman et al. |
| 2009/0133016 A1 | 5/2009 | Brown et al. |
| 2009/0138650 A1 | 5/2009 | Lin et al. |
| 2009/0177847 A1 | 7/2009 | Ceze et al. |
| 2009/0189442 A1 | 7/2009 | Chi |
| 2009/0225818 A1 | 9/2009 | Dapper et al. |
| 2009/0282050 A1 | 11/2009 | Thomas et al. |
| 2009/0282088 A1 | 11/2009 | Thomas et al. |
| 2009/0322531 A1 | 12/2009 | Estevez et al. |
| 2010/0017655 A1 | 1/2010 | Gooding et al. |
| 2010/0030932 A1 | 2/2010 | Ergas et al. |
| 2010/0082859 A1 | 4/2010 | Hendry et al. |
| 2010/0098419 A1 | 4/2010 | Levy et al. |
| 2010/0329319 A1 | 12/2010 | Dai et al. |
| 2011/0022859 A1 | 1/2011 | More et al. |
| 2011/0029696 A1 | 2/2011 | Uehara |
| 2011/0035575 A1 | 2/2011 | Kwon et al. |
| 2011/0052142 A1 | 3/2011 | Sultenfuss et al. |
| 2011/0083002 A1 | 4/2011 | Albers et al. |

(56) References Cited

U.S. PATENT DOCUMENTS

| | | |
|---|---|---|
| 2011/0219208 A1 | 9/2011 | Asaad et al. |
| 2011/0242425 A1 | 10/2011 | Zeng |
| 2011/0248865 A1 | 10/2011 | Hong et al. |
| 2011/0257983 A1 | 10/2011 | Rathonyi et al. |
| 2011/0276710 A1 | 11/2011 | Mighani et al. |
| 2011/0283031 A1 | 11/2011 | Lee |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0072658 A1 | 3/2012 | Hashimoto et al. |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama et al. |
| 2012/0159513 A1 | 6/2012 | Pakhunov et al. |
| 2012/0224640 A1 | 9/2012 | Sole et al. |
| 2012/0229076 A1 | 9/2012 | Zhu et al. |
| 2012/0306553 A1 | 12/2012 | Kim et al. |
| 2013/0050216 A1 | 2/2013 | Whitby-Strevens et al. |
| 2013/0057567 A1 | 3/2013 | Frank et al. |
| 2013/0091772 A1 | 4/2013 | Berger et al. |
| 2013/0124895 A1 | 5/2013 | Saha et al. |
| 2013/0138840 A1 | 5/2013 | Kegel et al. |
| 2013/0162911 A1 | 6/2013 | Glen |
| 2013/0290947 A1 | 10/2013 | Li |
| 2014/0033220 A1 | 1/2014 | Campbell et al. |
| 2014/0052976 A1 | 2/2014 | Marino et al. |
| 2014/0101468 A1 | 4/2014 | Narayanan et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0189392 A1 | 7/2014 | Bodio et al. |
| 2014/0211894 A1 | 7/2014 | Yang et al. |
| 2014/0215236 A1 | 7/2014 | Heinrich et al. |
| 2014/0244866 A1 | 8/2014 | Manula et al. |
| 2014/0247983 A1 | 9/2014 | MacInnis et al. |
| 2015/0036051 A1 | 2/2015 | Broberg et al. |
| 2015/0189109 A1 | 7/2015 | Whitby-Strevens |
| 2015/0205749 A1 | 7/2015 | Whitby-Strevens et al. |
| 2015/0212806 A1 | 7/2015 | Hsieh |
| 2015/0271265 A1* | 9/2015 | Kobayashi ......... H04L 67/1095 709/215 |
| 2015/0293873 A1 | 10/2015 | Shao et al. |
| 2015/0293875 A1 | 10/2015 | Sala et al. |
| 2015/0309650 A1 | 10/2015 | Ahmed et al. |
| 2015/0309940 A1 | 10/2015 | Kumar et al. |
| 2015/0378737 A1 | 12/2015 | Debbage et al. |
| 2016/0034195 A1 | 2/2016 | Li et al. |
| 2016/0041852 A1 | 2/2016 | Suarez Gracia et al. |
| 2016/0077989 A1 | 3/2016 | Pulyala et al. |
| 2016/0091959 A1 | 3/2016 | Barak et al. |
| 2016/0103480 A1 | 4/2016 | Sanghi et al. |
| 2016/0103689 A1 | 4/2016 | Sanghi et al. |
| 2016/0103743 A1* | 4/2016 | Sanghi ................ G06F 1/3228 714/19 |
| 2016/0142988 A1 | 5/2016 | Powell et al. |
| 2016/0179157 A1 | 6/2016 | Ardanaz et al. |
| 2016/0208539 A1 | 7/2016 | Hofmann et al. |
| 2016/0224097 A1 | 8/2016 | Hirouchi |
| 2016/0224442 A1 | 8/2016 | Sanghi et al. |
| 2016/0269991 A1 | 9/2016 | Van Greunen et al. |
| 2016/0299860 A1 | 10/2016 | Harriman |
| 2016/0363955 A1 | 12/2016 | Stevens et al. |
| 2016/0364350 A1* | 12/2016 | Sanghi ................... G06F 13/28 |
| 2017/0026975 A1 | 1/2017 | Maric et al. |
| 2017/0089641 A1 | 3/2017 | Humfeld et al. |
| 2017/0108912 A1 | 4/2017 | Li et al. |
| 2017/0177222 A1 | 6/2017 | Singh et al. |
| 2017/0185545 A1* | 6/2017 | Kaushik .............. G06F 13/4269 |
| 2017/0228481 A1 | 8/2017 | Pusuluri et al. |
| 2017/0249098 A1 | 8/2017 | Petkov et al. |
| 2017/0249164 A1 | 8/2017 | Petkov et al. |
| 2017/0269675 A1 | 9/2017 | Klacar et al. |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2018/0074572 A1 | 3/2018 | Bauman et al. |
| 2018/0101498 A1 | 4/2018 | Cosby et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0162770 A1 | 6/2018 | Hawtof et al. |
| 2018/0225251 A1 | 8/2018 | Sthoeger et al. |
| 2018/0367460 A1 | 12/2018 | Gao et al. |
| 2019/0073011 A1 | 3/2019 | Paterson et al. |

FOREIGN PATENT DOCUMENTS

| | | |
|---|---|---|
| JP | H03169996 A | 7/1991 |
| JP | 2004086792 A | 3/2004 |
| JP | 2012108677 A | 6/2012 |
| JP | 2013246642 A | 12/2013 |
| JP | 2015001867 A | 1/2015 |
| WO | WO-2008070138 A2 | 6/2008 |

OTHER PUBLICATIONS

Jackson, "PCI Express Technology", Sep. 2012 (Sep. 2012), MindShare Press, XP002777351, pp. 49,86,87,712-723.

PCI Express base Specification Revision 3.0, published Nov. 10, 2010.

PCI Express Base Specification Revision 3.1, published Oct. 8, 2014.

PCI Express Base Specification Revision 4.0 dated Oct. 5, 2017.

Universal Serial Bus, Communication Class, Subclass Specifications for Network Control Model (NCM) Devices; Revision 1.0 (Errata 1), Nov. 24, 2010, published by USB Implementers Forum, Inc.

* cited by examiner

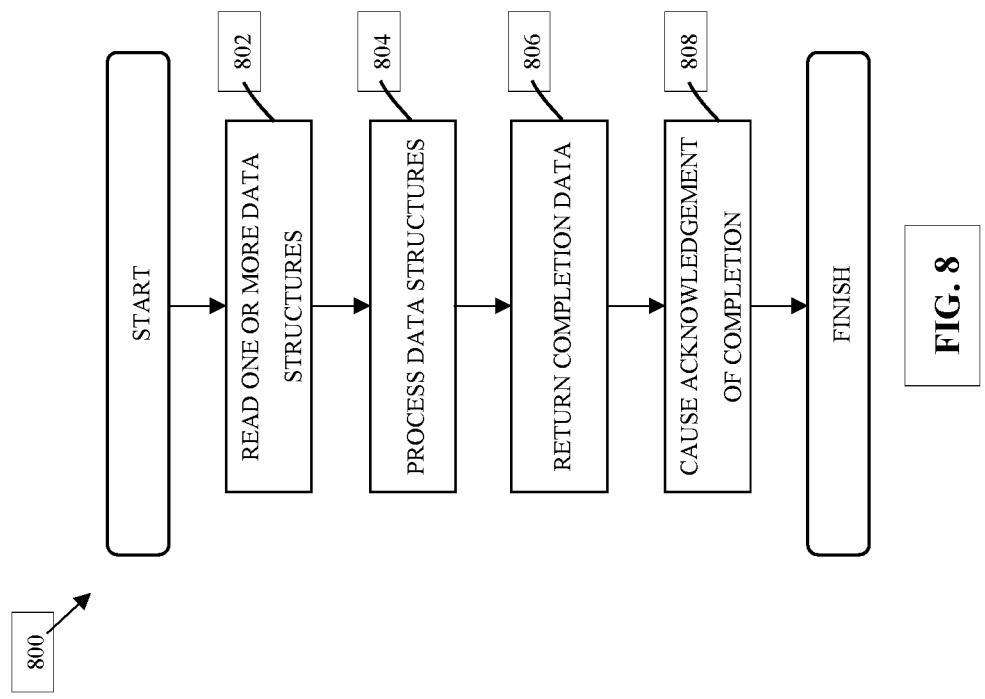

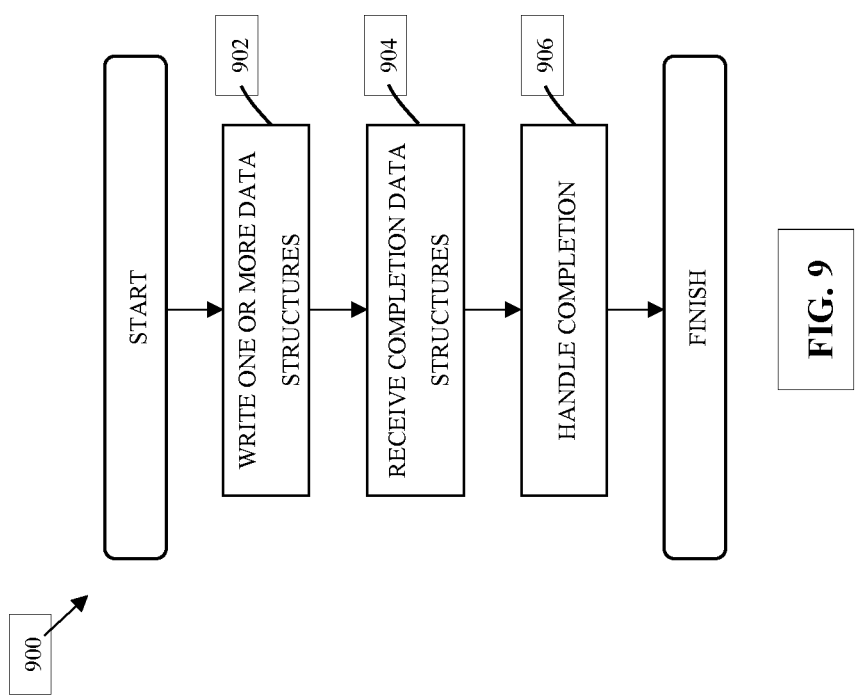

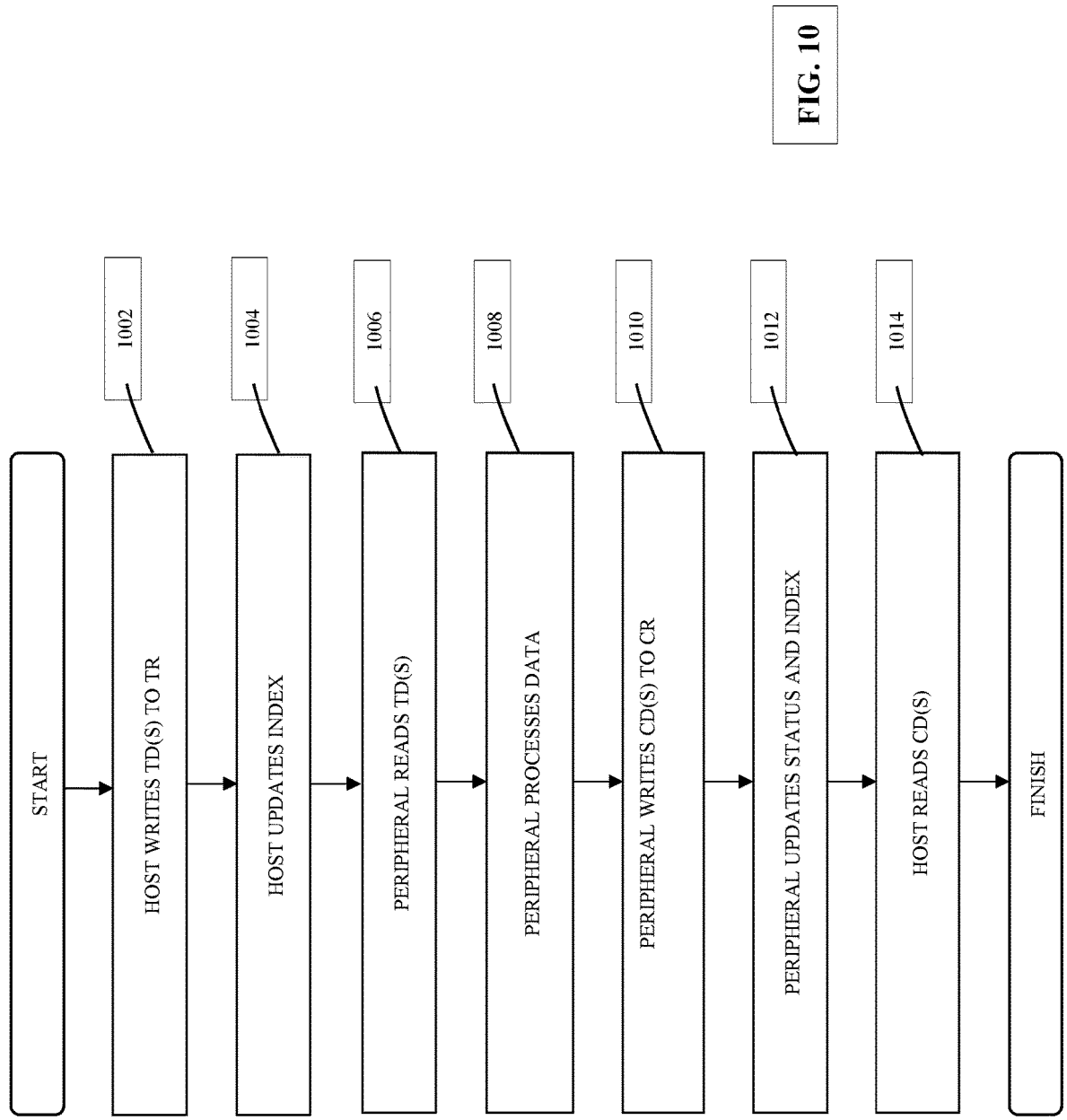

US 10,585,699 B2

METHODS AND APPARATUS FOR VERIFYING COMPLETION OF GROUPS OF DATA TRANSACTIONS BETWEEN PROCESSORS

RELATED APPLICATIONS

This application is related to commonly owned U.S. patent application Ser. No. 15/865,638 entitled "METHODS AND APPARATUS FOR REDUCED-LATENCY DATA TRANSMISSION OVER AN INTER-PROCESSOR COMMUNICATION LINK BETWEEN INDEPENDENTLY OPERABLE PROCESSORS" and filed Jan. 9, 2018, now U.S. Pat. No. 10,331,612; Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015, now U.S. Pat. No. 10,078,361; Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS" and filed Oct. 8, 2015, now U.S. Pat. No. 9,971,397; Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS" and filed Oct. 8, 2015, now U.S. Pat. No. 9,798,377, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNICAL FIELD

The disclosure relates generally to the field of electronics devices, as well as networks thereof. More particularly, and in one exemplary aspect, the disclosure is directed to methods and apparatus for implementing an inter-processor communication (IPC) link between two (or more) independently operable processors. In various exemplary aspects, the present disclosure is directed to optimized signaling for completion of groups of data transactions between two or more independently operable processors.

2. DESCRIPTION OF RELATED TECHNOLOGY

As consumer devices and computer systems continue to incorporate multiple processing components (such as processor chipsets), each of these multiple processors play a distinct role in accomplishing one or more functions of such consumer devices and systems. For example, smartphones, smartwatches, tablets, laptops, phablets, portable media players, smart home device (including use in conjunction with the so-called Internet of things (IoT)), and other mobile devices have become ubiquitous in everyday life. To support the increasing complexity of computing by these devices and systems, consumer devices increasingly rely on independent operation of processors.

Although various bus architectures and techniques have evolved over time to handle higher data rates and data throughput, they have stayed relatively limited to traditional computing purposes. One example of such a bus is the Peripheral Component Interconnect Express (PCIe); see, e.g., PCI Express Base Specification Revision 4.0 dated Oct. 5, 2017 ("PCIe Specification"), which is incorporated herein by reference in its entirety. PCIe is a high-speed serial computer expansion bus standard designed to replace older, conventional PCI (Peripheral Component Interconnect) and similar bus standards.

As alluded to above, PCIe has historically been used as serial computer expansion bus technology, and has had limited applicability beyond such applications. In terms of architecture, PCIe is based on point-to-point connectivity with separate serial links connecting every endpoint component (e.g., graphics card, memory) to the root complex (e.g., a host processor). Typically, PCIe transactions involve the transfer of bulk data, such as large collections of data from one or multiple sources, typically stored or buffered in dedicated memory modules (e.g., RAM).

Notably, PCIe has many desirable attributes in terms of, inter alia, performance, flexibility, and wide adoption. However, PCIe (as well as some other existing "computer-centric" bus technologies) suffers from certain disadvantages, especially from the standpoint of implementations in portable electronic consumer devices. Specifically, extant PCIe technologies were developed for use within desktop, server, and laptop computers, which to varying degrees were agnostic to many electrical power, memory, and/or data size considerations affecting peripheral devices or smaller portable devices. Desktops and servers (and laptops to a lesser degree) are less concerned with power consumption and conservation, and more concerned with bus performance, the ability to "hot plug" (i.e., adding a component to a running computer system), and the like.

PCIe was contemplated for, and best suited to, high-speed bulk data transfers. However, mobile consumer electronics have different considerations. As an example, consider the following implementation of PCIe in the context of data transmissions between two or more independently operable processors: When a host-side processor (e.g., an application processor) writes data to shared memory via an inter-processor communication (IPC) link, the host processor may write one or more transfer descriptors (TDs) to one or more transfer descriptor ring structures (TRs). Thereafter, a peripheral-side processor (e.g., a baseband processor) may read the data on the shared memory and also transmit the data upstream (e.g., via a modem in communication with a peripheral device). However, in this "fire and forget" mechanism, the host processor may only infer (but not be able to confirm or know) that the peripheral side processor has read the data for transmission upstream. More directly, the host processor does not know when the memory buffers in the shared memory can be allocated for another transfer; an incorrect inference may result in overwriting buffer data that is not yet read.

There is a need for a mechanism that allows a processor to know that a transaction of the data it has written has completed in order to verify the integrity of data transmissions, particularly over inter-processor communication (IPC) links between two or more independently operable processors. Ideally, such data verification communication should be performed with a minimum amount of overhead. More specifically, there is a need for improved apparatus and associated methods that can leverage the flexible attributes of IPC bus technologies such as PCIe (and other "memory mapped" technologies), yet support the desirable benefits of low-latency transactions and the ability to support the functionalities of various chipsets within today's devices (including, e.g., wireless modems). Such a mechanism may reduce and/or substantially eliminate waiting or confirmation times, thereby improving speed of operation between independently operable processors.

SUMMARY

The present disclosure satisfies the foregoing needs by providing, inter alia, methods and apparatus for acknowledgment and verification of groups of data transmissions over an inter-processor communication (IPC) link between two (or more) independently operable processors.

A method of acknowledging a completion of a transaction of data via an inter-processor communication (IPC) link between a first independently operable processor apparatus and a second independently operable processor apparatus is disclosed. In one embodiment, the method includes: reading, by the second independently operable processor apparatus, a first data structure representative of the data, the first data structure being written by the first independently operable processor apparatus to a shared memory structure; retrieving and processing the data; writing, by the second independently operable processor apparatus, a second data structure to the shared memory structure, the second data structure comprising information associated with the processing of the data and being readable by the first independently operable processor apparatus; and causing the first independently operable processor apparatus to read the second data structure.

In a first variant, the second data structure comprises information associated with a group of data transactions. In one exemplary variant, the group of data transactions are sequentially ordered. In one implementation, the information associated with the group of data transactions comprises an explicit completion status for only one data transaction.

In a second variant, the explicit completion status for only one data transaction is distributed to at least one prior sequentially ordered data transaction.

In a third variant, writing information associated with processing of the retrieved data comprises one or more of a success, failure, timeout, or indeterminate status.

In a fourth variant, the reading, by the second independently operable processor apparatus, the first data structure representative of the data comprises reading a series of data structures from the shared memory structure; and the writing, by the second independently operable processor apparatus, comprises writing to the shared memory structure a corresponding series of data structures according to an ordered sequence corresponding to the series of data structures.

A user device is disclosed. In one embodiment, the user device includes: a first processor apparatus and a second processor apparatus; a shared memory structure comprising a first memory structure and a second memory structure; and a non-transitory computer-readable apparatus comprising a storage medium having a computer program stored thereon. In one exemplary embodiment, the computer program includes instructions configured to, when executed, cause the second processor apparatus to: read a plurality of first data structures from the first memory structure, the plurality of first data structures being written by the first processor apparatus; transact the payloads in an order based on a sequence of the plurality of first data structures; and subsequent to transaction of the payloads, write to the second memory structure a plurality of second data structures corresponding to the plurality of first data structures, the plurality of second data structures indicative of a completion status corresponding to the transaction of the payloads.

In one variant, a single completion status corresponds to multiple payload transactions. In one exemplary variant, the single completion status identifies a single payload transaction explicitly. Additionally, in one such variant, the single completion status implicitly includes at least one other payload transaction status.

In a second variant, the instructions are further configured to, when executed, cause the second processor apparatus to: cause the first processor apparatus to remove at least one of the plurality of first data structures from the first memory structure based on the plurality of second data structures indicative of the completion status corresponding to the at least one of the plurality of first data structures.

In a third variant, the instructions are further configured to, when executed, cause the second processor apparatus to: responsive to the retrieval of the payloads, update a first index value indicative to the first processor apparatus of a presence of the plurality of second data structures; and responsive to the transaction of the payloads, update a second index value indicative to the first processor apparatus of the completion of the transaction of the payloads.

A system configured to enable verification of a data transaction over an inter-processor communication (IPC) link between two or more independently operable processors is disclosed. In one embodiment, the system includes: a shared memory structure comprising a transfer descriptor ring and a completion descriptor ring, the shared memory structure being accessible to a first processor apparatus and second processor apparatus via the IPC link; wherein the first processor apparatus is configured to: write one or more transfer descriptors to the transfer descriptor ring, the transfer descriptor being descriptive of data to be processed by the second processor apparatus; and in response to processing of the data by the second processor apparatus, read one or more completion descriptors, and acknowledge the processing of the data by the second processor apparatus; and wherein the second processor apparatus is configured to: retrieve the data based on information read from the one or more transfer descriptors from the transfer descriptor ring; and in response to the processing of the data, write the one or more completion descriptors to the completion descriptor ring.

In one variant, the second processor apparatus is further configured to process the retrieved data in a sequence dictated by the one or more transfer descriptors.

In a second variant, the first processor apparatus is further configured to write one or more new transfer descriptors to the transfer descriptor ring upon the acknowledgment of the processing of the data by the second processor apparatus.

In a third variant, the first processor apparatus is further configured to update a first index value upon the reading of the one or more completion descriptors, or the writing of the new one or more transfer descriptors; and the second processor apparatus is further configured to update a second index value upon reading of the one or more transfer descriptors, or the writing of the one or more completion descriptors. In one such variant, the second processor apparatus is further configured to check for the update to the first index value based on a likelihood of receiving a signal from the first processor apparatus.

In a fourth variant, the second processor is further configured to process the data only upon receiving a message from the first processor; and the first processor is further configured to read the one or more completion descriptors only upon receiving a message from the second processor.

In a fifth variant, the first processor apparatus comprises an application processor; the second processor apparatus comprises a baseband processor; the baseband processor is configured to be in data communication with an air interface associated with a modem configured to be in data communication with a peripheral device; and the processing of the data comprises a data transaction for the modem of the peripheral device.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 8 illustrates one exemplary method for acknowledging a completion of a data transaction between two or more independently operable processors in accordance with the principles described herein.

FIG. 9 illustrates one exemplary method for handling a completion of a data transaction in accordance with the principles described herein.

FIG. 10 illustrates one exemplary method for processing a data transaction between two or more independently operable processors in accordance with the principles described herein.

Figure 1:
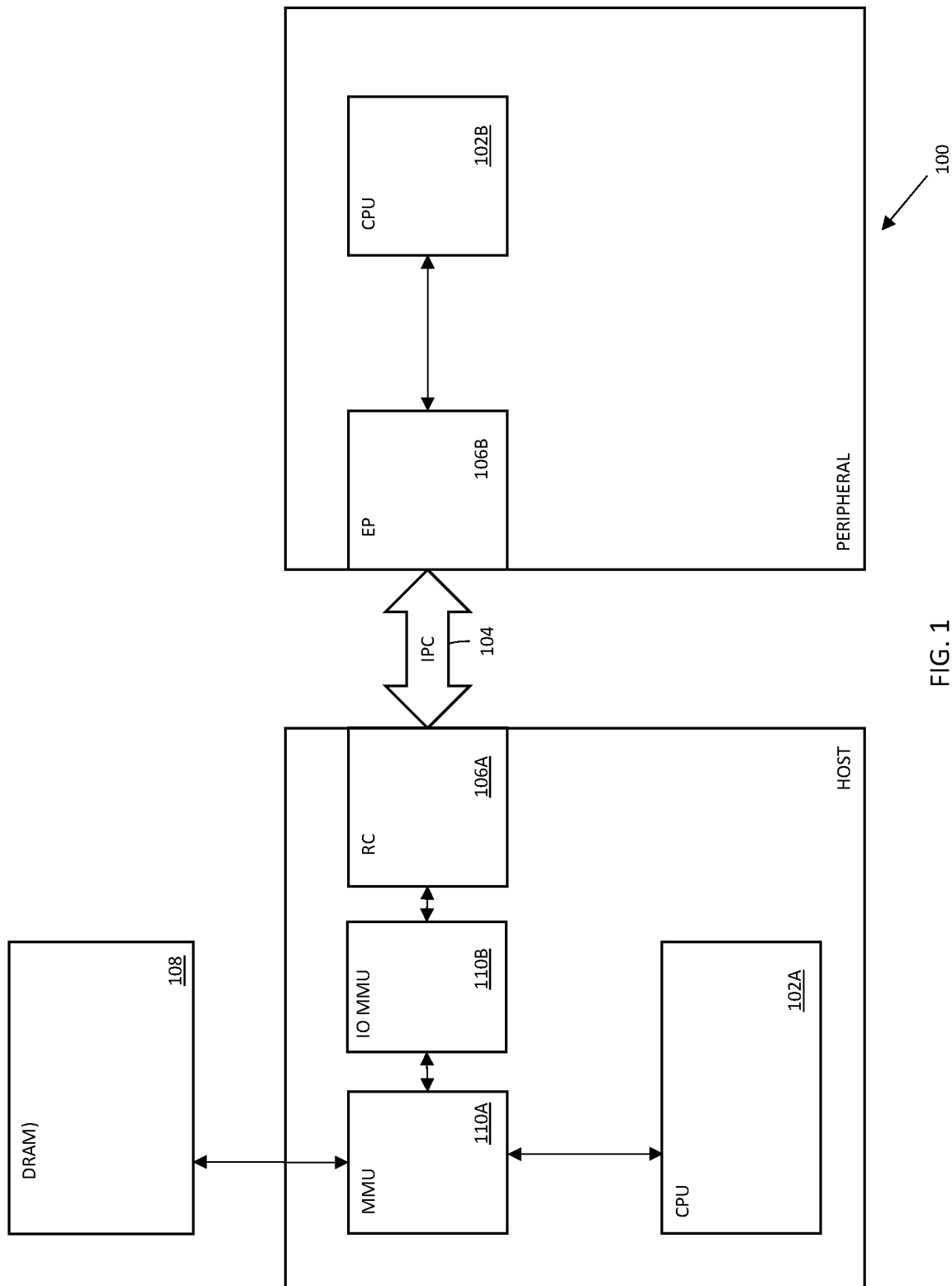
FIG. 1 illustrates an exemplary apparatus useful for illustrating various principles described herein.

All figures © Copyright 2018 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of an inter-processor communication (IPC) link (for example, of the type described within commonly owned and co-pending U.S. patent application Ser. No. 14/856,283 entitled "METHODS AND APPARATUS FOR AGGREGATING PACKET TRANSFER OVER A VIRTUAL BUS INTERFACE" and filed Sep. 16, 2015, now U.S. Pat. No. 9,830,289, incorporated herein by reference in its entirety), it will be recognized by those of ordinary skill that the present disclosure is not so limited. In fact, the various aspects of the disclosure are useful in any device or network of devices that is configured to incorporate and coordinate multiple independently operable processing elements, as is disclosed herein.

Various embodiments described herein may be used in conjunction with power management schemes such as those described within commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015, now U.S. Pat. No. 10,078,361, previously incorporated by reference in its entirety.

Exemplary Inter-Processor Communications Link

As previously noted, bus techniques have evolved which are able to handle faster data rates and provide higher levels of data throughput. One such example bus technology is referred to as a so-called Peripheral Component Interconnect Express (PCIe) bus. PCIe has historically been used as a high-speed serial computer expansion bus technology; PCIe is based on point-to-point connectivity with separate serial links connecting every endpoint component (e.g., graphics card, memory, etc.) to the root complex (e.g., host processor). However, existing PCIe technologies consume significant power and are unsuitable for relatively low-power and low-latency communication protocols used in consumer electronics applications. Current PCIe bus protocols perform operations involving data transactions that are more appropriate for bulk, high-throughput data communication between a "peripheral" processor and the "host" processor.

Within this context, exemplary methods and apparatus are now described which support an inter-processor communication (IPC) link between two (or more) independently operable processors. The following discussions will be described in reference to a "root complex" (RC) or host processor, and an "endpoint" (EP) or peripheral processor. For reasons which will become apparent below, it is appreciated that the designation as to host or peripheral processor is used to simplify and/or clarify the following explanations, and does not imply existing host or peripheral functionality, or that such roles cannot be reversed. Moreover, those of ordinary skill in the related arts will readily appreciate that the various principles described herein, may broadly apply to any network of two (or more) independently operable processors. Further, the various principles described herein may apply to transactions from a host processor to a peripheral processor and vice versa.

As used herein, the term "independently operable processor" refers to a processing system having one or more of the processor clock domain, processor power domain, processor code base, arithmetic units, registers, and/or memory, capable of being isolated to allow the processor to operate without other processors in the processing system. In one exemplary embodiment, an independently operable processor can transition into various power-conserving modes independent of the power-conserving modes of other ones of the plurality of sub-systems. In another embodiment, an independently operable processor can adjust its clock frequency, phase, and/or amplitudes, independent of the power-conserving modes of other ones of the plurality of subsystems. In still another embodiment, an independently operable processor can reboot and/or update its firmware or software independent of the software execution of other ones of the plurality of sub-systems.

As used herein, a "processor" refers generally to any logic or circuitry that responds to and processes computer-readable instructions or firmware that are stored within, for example, a non-transitory computer-readable medium, e.g., a memory. A processor may be embodied in hardware (e.g., an integrated circuit (IC)) that performs logical operations according to the instructions. Examples of processing alternatives include, without limitation, reduced instruction set computer (RISC) processors, complex instruction set computing (CISC) processors, field-programmable gate arrays (FPGAs), application specific integrated circuits (ASICs), and programmable logic devices (PLDs).

As used herein, a "baseband processor" is a processor that is configured to communicate with a wireless network. Common examples of wireless networks include, without limitation, Long Term Evolution/Advanced (LTE and LTE-A) technology, IEEE-Std. 802.11 (any variants thereof), PAN technology such as e.g., Bluetooth (IEEE Std. 802.15.1) or IEEE Std. 802.15.4, "ZigBee", Short Messaging Service (SMS), near field communication (NFC) or radio-frequency identification (RFID), WiMAX (IEEE 802.16), WMANs, 3G cellular (e.g., WCDMA, 3GPP, 3GPP2, and GSM and improvements thereon, and ISM band networks.)

In one aspect, the IPC protocol may be based on a "shared" memory interface for run-time processing. That is, the independently operable processors may each share, either virtually or physically, a common memory interface. In one such embodiment, the shared memory interface provides a multi-channel IPC link for high throughput transfers. In one exemplary implementation, the shared memory interface remains functional when any one of the independently operable processors is active, even when one or more of the remaining independently operable processors are asleep, powered down, powered off, etc.

As used herein, the term "logical" or "virtual" are interchangeably used to refer to, without limitation, an abstraction (typically performed in software or machine logic) to represent physical mechanisms, attributes or functionalities as a data structure. For example, as used herein a "logical bus interface," "virtual bus interface," etc., refer generally to an abstraction or representation of a bus interface as a series of data structures. In contrast, a "physical bus interface" as used herein refers to the physical mechanisms, attributes or functionalities of a physically tangible bus interface.

FIG. 1 illustrates exemplary apparatus 100 useful for illustrating various principles described herein. As shown, the apparatus 100 includes first and second independently operable processors 102A, 102B, and a physical bus interface 104 that is configured to implement an inter-processor communication (IPC) link between the two (or more) independently operable processors.

In one exemplary embodiment, the first and second processor are connected via a bus interface. As used herein, the term "bus interface" refers to any communication system that transfers data between processors and/or peripheral components. A bus interface may include, in part or whole, hardware components (wiring, optical fiber, and other transmission mediums) and/or associated software (including communication protocols and hardware drivers.)

As used herein, an "inter-processor communication link" or "IPC link" refers to any communication bus between two (or more) processors, whether the processors are operating independently, not independently, or a combination thereof. An IPC link may include one or more data pipes that are configured to transfer data from one processor to another, for example, between a host side (e.g., root complex) and peripheral side (e.g., endpoint) of the link. A given data pipe of an IPC link may be configured to transfer the data in a unidirectional or bidirectional fashion.

As used herein, "unidirectional" relates to transmission or reception of data (e.g., instructions, packets, signals) in one direction such that the data is only configured to be transferred from a given computing entity (e.g., logic, circuitry, processor) to another computing entity, but not in the other direction (i.e., from the other computing entity back to the given computing entity).

On the other hand, "bidirectional" or "multidirectional" relates to transaction of data (e.g., instructions, packets, signals) in two or more directions such that the data may be configured to be transferred between a given computing entity (e.g., logic, circuitry, processor) to another computing entity (and vice versa).

In one implementation, the first processor 102A includes an application processor. As shown in FIG. 1, the first processor 102A is coupled to a root complex (RC) 106A which functions as the host of the IPC bus.

In one implementation, the second processor 102B includes a wireless modem. In various embodiments, the second processor 102B includes a Wi-Fi modem, cellular modem, mobile broadband modem, Bluetooth modem, NFC modem, and/or RFID reader, and/or other short-range and long-range protocols so as to comprise a wireless communication chipset. Other examples of wireless modems include, without limitation devices implementing e.g., IEEE Std. 802.11 (any variants thereof, including Wi-Fi and wireless local area network (WLAN)), PAN technology such as e.g., Bluetooth or IEEE Std. 802.15.4, "ZigBee", NFC or RFID, WiMAX (IEEE 802.16), WMANs, 3G cellular (e.g., Long Term Evolution/Advanced (LTE and LTE-A), WCDMA, 3GPP, 3GPP2, and GSM and improvements thereon), and ISM band devices.

In other embodiments, the second processor 102B may be, e.g., a media processor or other network processing element.

As shown in FIG. 1, the second processor 102B is coupled to an endpoint (EP) 106B which functions as the peripheral of the IPC link.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. In some cases, the first and/or second processors may have an associated non-volatile memory (e.g., a flash memory) which is configured to store computer readable instructions, and retain the stored computer readable instructions without power. The non-transitory computer readable medium is configured to store computer readable instructions for execution. Such computer-readable instructions may alternatively or additionally be stored on a local cache associated with at least one of the processors.

As used herein, the term "buffer" refers to a device, circuit, logic, or an area of a computing environment that is used to store data temporarily. Typically, buffered data is stored until instructions are given or received to move the stored data to another entity (e.g., processor, memory, another buffer), or "flush" (empty) the buffer. The term "buffer" may be interchangeable with similar terms such as "cache," "queue," "shared memory," or "local memory" depending on the context. In one embodiment, a buffer may be a type of memory. Examples of types of buffers may include, circular or ring buffer, FIFO (first in, first out), LIFO (latest in, first out), round robin, shortest job first, shortest remaining time, dynamic array. In another embodiment, a buffer may refer to a data structure or memory allocation, e.g., data represented by a so-called transfer descriptor (TD), completion descriptor (CD), transfer descriptor ring (TR), completion descriptor ring (CR), or any other such scheme for storing and/or organizing data. Persons of ordinary skill in the relevant art will recognize various other structures and operations related to buffering and temporary data storage.

Moreover, as used herein, "shared memory" refers to a memory device that is accessible by two or more processor apparatus. In some contexts, a "shared memory" may operate as a cache or buffer. In one embodiment, shared memory is configured to allow a processor to write data thereto, so as to enable a different processor to read the data. For example, a processor (e.g., an independently operable processor) may write so-called transfer descriptors (TDs) to a so-called transfer descriptor ring (TR) residing on the shared memory (or vice versa). Another processor (e.g., a different independently operable processor) may read the TDs on the shared memory. In one embodiment, a processor may write so-called completion descriptors (CDs) to a so-called completion descriptor ring (CR) residing on the shared memory, for another processor to read. Functions of TD, TR, CD and CR will be described in greater detail below. While the foregoing envisions three separate entities (two processors and a shared memory device), artisans of ordinary skill will recognize that a given shared memory device may reside on one (or each) of the processors, and/or stand alone as an apparatus that is separate from the processors and accessible by one or more processors.

As shown in FIG. 1, both the first and the second processors (102A, 102B) are each coupled to a non-transitory computer readable medium (e.g., dynamic random access memory (DRAM) 108) and one or more memory management units (MMUs). A MMU translates virtual memory addresses (which are allocated within a processor's memory map) to physical addresses in the DRAM 108. In one exemplary embodiment, the MMU is further subdivided into a MMU 110A and an Input Output MMU 110B thereby allowing for the host and peripheral to have distinct memory maps (e.g., a virtual memory addresses for the host and virtual IO addresses for the peripheral). While the foregoing split MMU configuration is illustrated, artisans of ordinary skill in the related arts will readily appreciate that a single MMU or more MMUs (three, four, etc.) may be substituted with equivalent success given the contents of the present disclosure.

Figure 1A:
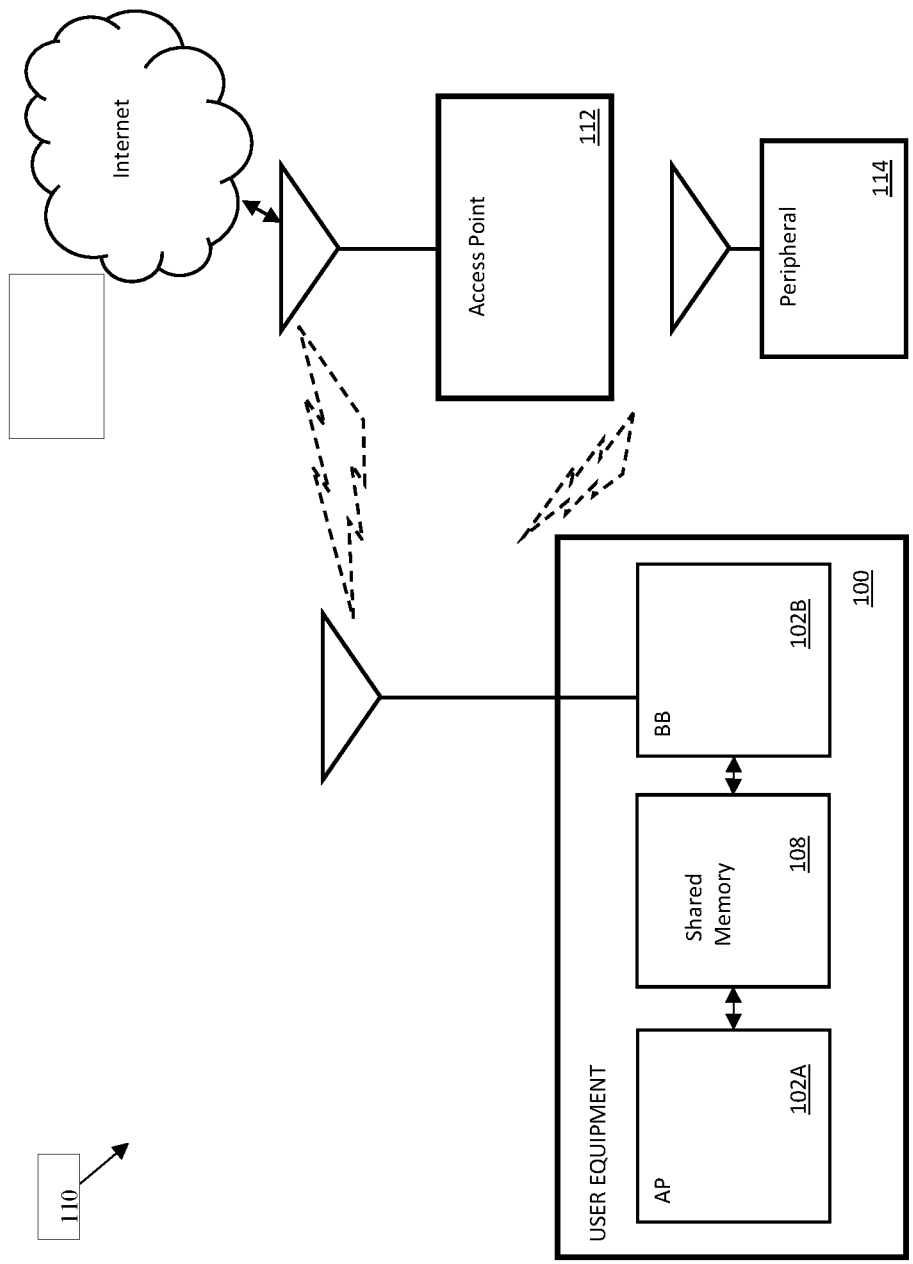
FIG. 1A illustrates an exemplary network architecture useful for implementing various principles described herein.

FIG. 1A illustrates an exemplary network architecture 110 useful for implementing various principles described herein. In an exemplary embodiment, the architecture 110 includes user equipment 100 that includes a host-side processor (e.g., application processor 102A), a peripheral-side processor (e.g., baseband processor 102B), and a shared memory module (e.g., DRAM 108) between the application processor and the baseband processor. The application processor and baseband processor may comprise independently operable processors in data communication via an IPC link. The shared memory module 108 may comprise memory structures (including designated memory slots) for writing and reading data by the application processor and the baseband processor according to the principles described herein.

In various embodiments, a user equipment 100 may house the independently operable processors and use the functions thereof. In one exemplary embodiment, the user equipment 100 may be a mobile computing device or system for the consumer or end user, such as a smartphone, smartwatch, tablet, or laptop. The user equipment 100 may be configured for wireless connectivity and/or wired connectivity via at least the baseband processor 102B. In one variant, the processors include integrated circuits (IC) disposed on a semiconductor die for operation of the user equipment. For example, the baseband processor may include (or be in data communication with) a wireless modem for cellular or Wi-Fi connectivity (or any other means of connectivity, such as Bluetooth, RFID, Global Positioning System (GPS)).

In some embodiments, as shown, the user equipment 100 may be in data communication with other external devices. In one embodiment, the application processor 102A may be connected to an access point 112, by wired or wireless means, via the baseband 102B (via implementations of Wi-Fi, cellular, Bluetooth, NFC, etc.). The access point 112 may in turn enable exchange of data to and from local intranets, the Internet, and/or other networks including wireless networks. In another embodiment, the user equipment may be in data communication with a peripheral device 114. Exemplary peripheral devices include, but are not limited to, wireless keyboards, mice, audio equipment (e.g., earbuds, headset, speakers), home and office equipment (e.g., wireless printers), and other user equipment. In some embodiments, the peripheral device may also be in data communication with other networks or devices (e.g., the access point 112 and/or e.g., intranets, the Internet, etc.) to receive and send data.

In the exemplary embodiment, the data exchanged via the baseband processor 102B may be generated by the application processor 102A and sent "upstream" to the access point 112, or the data may be transmitted from the access point "downstream" to the application processor 102A via the baseband processor 102B. Each of the application processor and the baseband processor may generate its own data for the other processor(s) to process. Furthermore, each of the processors may transmit (and/or receive) related data represented by or encapsulated directly in transfer descriptors (TDs) and/or completion descriptors (CDs), as will be detailed further herein.

Figure 2:
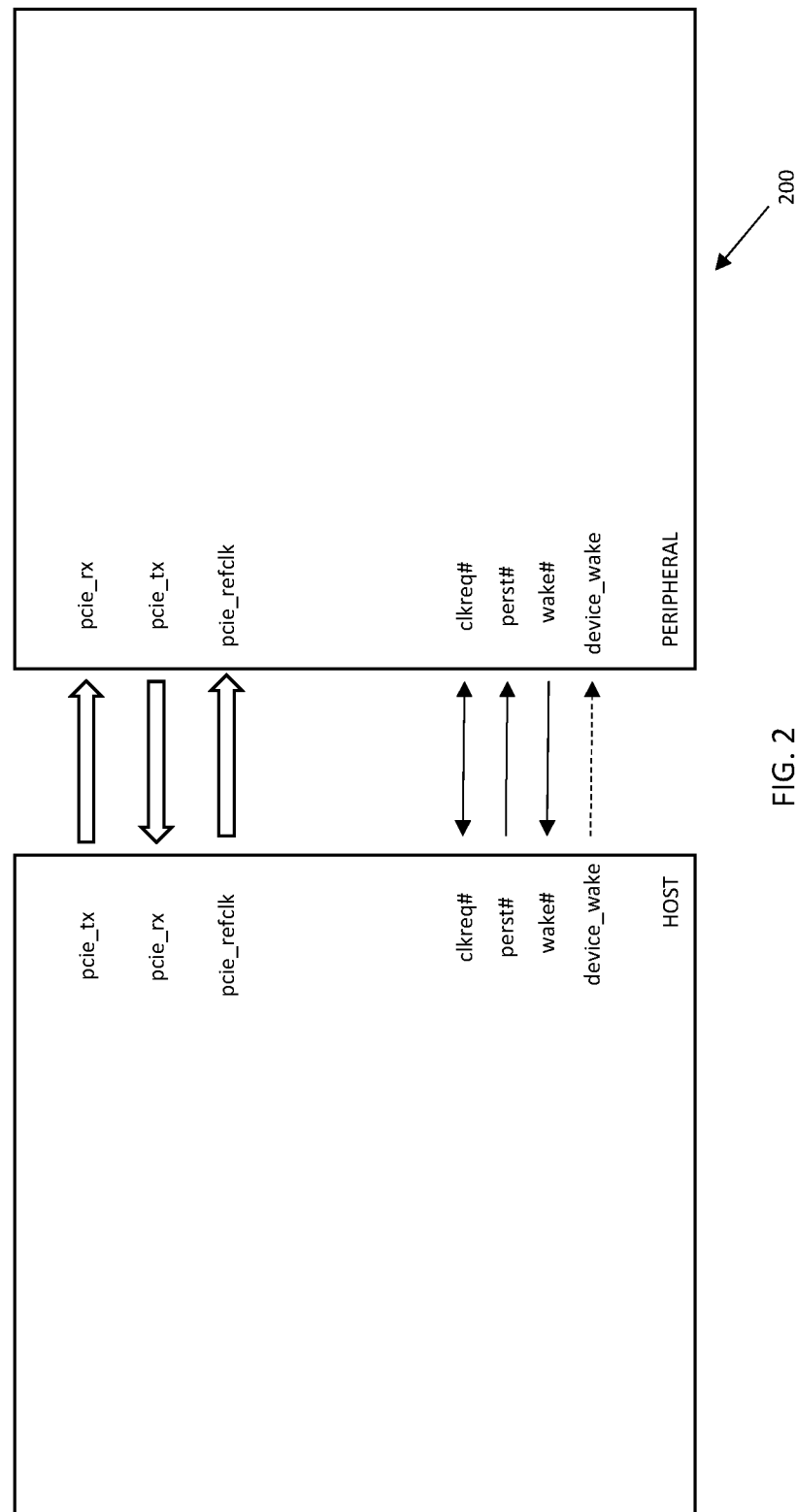
FIG. 2 illustrates an exemplary inter-processor communications link, useful for illustrating various principles described herein.

Now referring to FIG. 2, the physical bus interface 200 includes an IPC link that may be loosely based on the Peripheral Component Interconnect Express (PCIe) standard in one exemplary embodiment (e.g., the aforementioned PCI Express Base Specification Revision 4.0 dated Oct. 5, 2017, previously incorporated by reference in its entirety). Those of ordinary skill in the related arts, given the contents of the present disclosure, will readily appreciate that other bus interface standards may be substituted with equal success. Various modifications to the underlying physical bus interface 200 (and protocols used therewith) to improve IPC functionality with respect to optimizing data transactions, as well as acknowledgments and verifications for completions thereof between independently operable processors are described in greater detail hereinafter.

In the exemplary embodiment, the physical bus interface 200 may be a point-to-point communication channel between two IPC ports (the RC and EP) allowing both to send/receive access requests (configuration read/write, I/O read/write, memory read/write) and interrupts. At the physical level, a link is composed of one or more lanes (one shown in FIG. 2), each lane having receive and transmit component (e.g., pcie_rx and pci_tx). Each lane is a fullduplex byte stream, transporting data packets in eight-bit 'byte' formats, between the RC and EP of a link, in both directions simultaneously. The physical bus interface 200 may support multiple logical links (or virtual bus interfaces) representing multiple ongoing data sessions.

In one such embodiment, each virtual bus interface may further include one or more "sessions" which are a persistent and/or semi-persistent set of data transactions (e.g., datagrams) between two logical endpoints. In some embodiments, the session may include "stateful" transactions (i.e., the data transactions are based on a current state of the session), and/or "stateless" transactions (i.e., the data transactions are not based on a current state of the session).

In-Place Protocol

Figure 3:
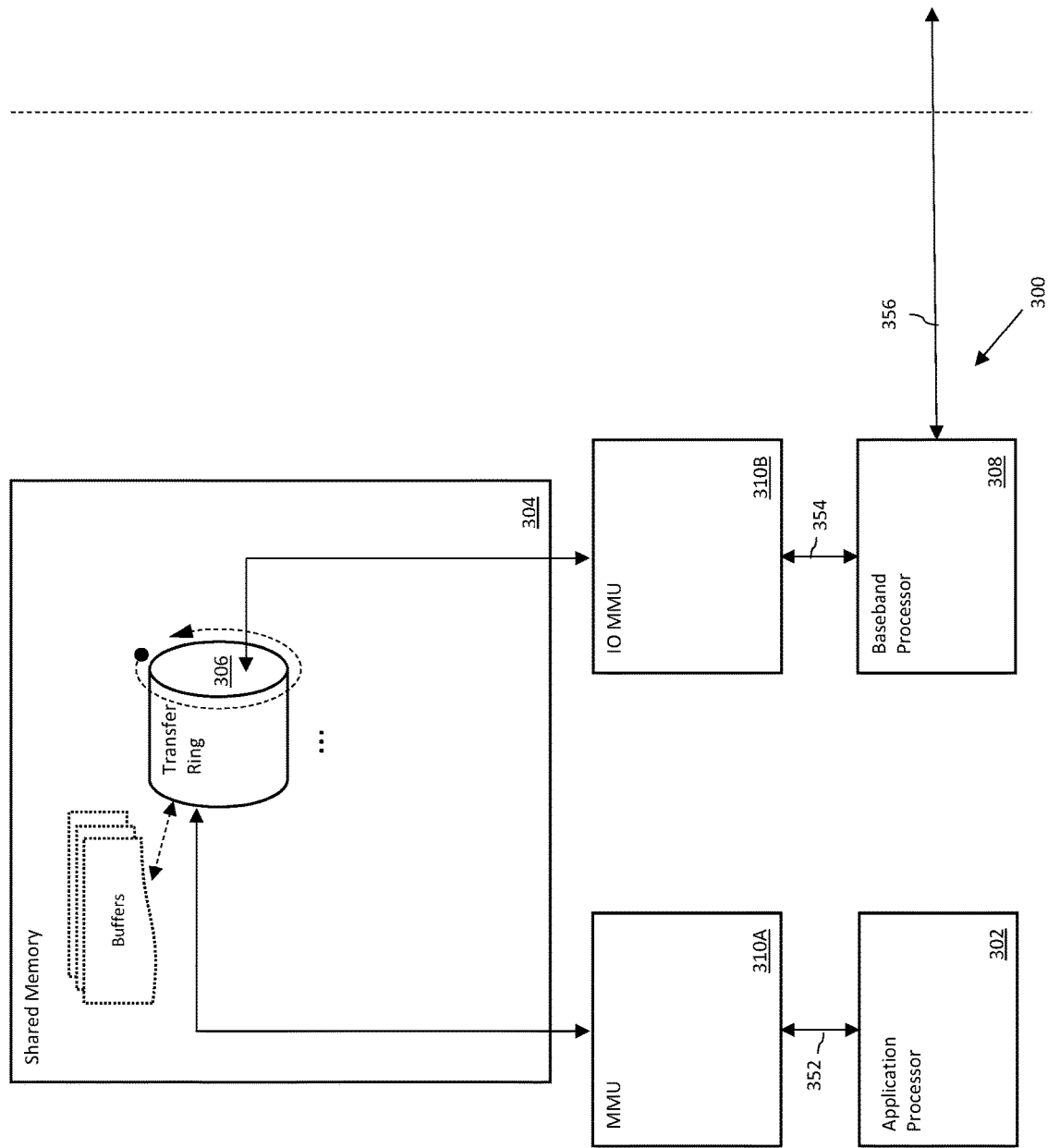
FIG. 3 illustrates a generalized memory layout, useful for illustrating in-place completion described herein.

FIG. 3 illustrates an exemplary "in-place" transmission protocol for data transactions between two or more independently operable processors. The exemplary in-place scheme uses transfer descriptors (TDs) in a shared memory to imply transfer status without express signaling.

As a brief aside, an IPC link may include at least one pair of unidirectional pipes. In some variants, the IPC link may alternatively or additionally include at least one pair of bidirectional or multidirectional pipes. In various other embodiments, one processor may be in data communication with a plurality of other processor apparatuses via one or more IPC links. For example, in some embodiments, the host may be connected to multiple peripheral processors. In other embodiments, multiple host processors may be connected to a given peripheral processor. More generally, any number of hosts and any number of processors may be connected together according to the aforementioned IPC bus.

Data transactions (e.g., in input/output (I/O) transactions) associated with one or more data pipes may be composed of at least one "transfer descriptor" (TD) that may be identified within a "transfer descriptor ring" (TR) described infra. In one embodiment, a single TD may describe a physically contiguous memory buffer, accessible by the host and/or the peripheral processors over the communication link. A TD may include various fields, such as the type of the descriptor, size of the buffer, address of the buffer, tag unique to the buffer described by the TD, remaining count indicating the number of TDs remaining in a packet transfer, a header with information at the beginning of the TD, or a footer and/or a header field containing data such as metadata or data associated with each TD.

Each "pipe" (data stream) may be associated with one "transfer descriptor ring" (TR), also called "transfer ring". During, for example, exemplary in-place operation, TDs sit inside a TR data structure that resides in a memory structure (e.g., a DRAM coupled to the host processor that is a shared memory also accessible by the peripheral processor). Each TR is configured to encompass multiple TDs. Each TR may be described by a TR head index (also referred to as a head pointer) and/or a TR tail index (also referred to as a tail pointer). The head pointer points to the next empty slot in the TR that the host will process, whereas the tail pointer points to the address of the next TD which the peripheral processor will process. The head pointer may be written by the host and read by the peripheral. The tail pointer may be read by the host and written by the peripheral. When the head pointer of the TR is equal to its tail pointer, the TR is empty.

Processing a TR may be either a read or a write. For example, in order to perform a write, the host processor allocates a buffer for the write that is defined by a TR. The size of the write determines the number of TDs in the TR. The host writes data to the buffer, and provides the buffer to the peripheral. Thereafter, the peripheral can read from the buffer to effectuate the write. Similarly, in order to perform a read, the host processor allocates a buffer for the read; the size of the read is determined by the number of TDs in the TR. The buffer (still empty) is provided to the peripheral and the peripheral fills the buffer. When the buffer is full, the peripheral notifies the host and the host reads the data stored in the buffer.

The TD/TR data structure enables independent queue processing for both the host and peripheral processors. For example, the peripheral can read from one area of memory described by a first TD while the other host writes to a different area of memory to prepare a different TD. Processing may be performed on a, e.g., best-effort, prioritized, round robin, weighted round robin, or any number of other ordering basis. In some cases, TDs may be queued and/or flushed according to ongoing flow control and/or other bandwidth management. Various other schemes for TD processing will be readily appreciated by those of ordinary skill, given the contents of the present disclosure, for example, as used for the various data transmission schemes over an IPC link as described in U.S. patent application Ser. No. 15/865,638 entitled "METHODS AND APPARATUS FOR REDUCED-LATENCY DATA TRANSMISSION OVER AN INTER-PROCESSOR COMMUNICATION LINK BETWEEN INDEPENDENTLY OPERABLE PROCESSORS" and filed Jan. 9, 2018, now U.S. Pat. No. 10,331,612, incorporated supra.

As shown in the exemplary "in-place" mechanism of FIG. 3, a first processor 302 (e.g., a host or application processor) first writes data to a shared memory 304. Specifically, the first processor 302 may write one or more TDs to a transfer descriptor ring (TR) 306 that resides on the shared memory 304. Each TD may include data, or point to data (e.g., residing on a separate memory module) to be delivered to/from another second processor 308 (e.g., a peripheral or baseband processor) and/or to another device (e.g., a peripheral device or an access point). After allocating the TDs to the TR 306, the first processor 302 updates a head index residing in shared memory 304. For write accesses, the backing buffers associated with the allocated TDs are filled with data; for read accesses, the backing buffers are reserved for the second processor to write into.

In various embodiments, the data included in the TD may broadly refer to a payload for delivery to/from the second processor 308 or another device. Artisans of ordinary skill in the related arts will readily appreciate that a "payload" as used herein broadly refers to a portion of transmitted packetized data that includes an intended message. The payload excludes protocol information used for, e.g., routing the message, error correction, flow control, and other transactional overhead. For example, in addition to the payload, a data packet (including, e.g., a transfer descriptor) may include metadata or other fields sent solely to facilitate the delivery of the payload. In another example, the payload may be included with a segment of a packet that is typically not used for payload delivery, such as a header or footer component of a transfer descriptor.

As a brief aside, there are a wide variety of "data types" used in the computing arts. As used herein, "data types" refer to specific formats or constructions of data that can be classified and/or used by logic (e.g., hardware, firmware, compiler or software, processor, programmable logic, etc.) to identify how the data is being used. Data types are not limited to "natively" understood data types or generic data types; some data types may be dynamically defined in software, and specialized or specifically designed for a particular function or operation.

So-called "value" data types are data types that signify one or more values to the compiler. Common examples of value data types include, without limitation: Booleans, characters, integer numbers, floating-point numbers, and fixed-point numbers. Another family of commonly used data types are so-called "reference" data types; reference data types are interpreted by logic to "refer" to other data. Common examples of reference data types include without limitation, references and pointers. Some hybrid data types may take on the characteristics of either value or reference data types, depending on how they are handled by the logic; such hybrid data types include, without limitation: arrays, multi-dimensional arrays, lists, dictionaries, sets, stacks, queues, and enumerations. For example, a list may be treated as a value and compiled "in-line" (i.e., a compiler copies list values at each instance of the list), or treated as a reference (i.e., the complier references a memory location for each instance of the list).

Within the context of the present disclosure, as used herein, the term "pointer" refers to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "descriptor" refers to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.)

As used herein, a "footer" component refers to data associated with, and following, a data structure or a portion thereof (e.g., a transfer descriptor, completion descriptor). As used herein, a "header" component refers to data associated with, and preceding, a data structure or a portion thereof (e.g., a transfer descriptor, completion descriptor). A header or footer may be an optional component of a transfer descriptor or a completion descriptor. Similarly, a header or footer may include data (e.g., a payload) or metadata that describes the descriptor, packet, and/or payload.

Referring back to FIG. 3, the shared memory 304 is accessible by the first processor 302 via a memory management unit (MMU) 310A and is also accessible by a second processor via an IO MMU 310B. In one variant, the shared memory may reside on one of the processors (e.g., the first processor 302), such that data can be read from or written to the shared memory via the internal busses of the processor. The second processor 308 may access the shared memory via an external memory bus interface. In another variant, the application processor 302 and baseband processor 308 are each separately coupled to a shared memory (e.g., a two-port (both read/write) or dual port (one read, one write) RAM). In other variants, the processors share an interface to the shared memory (e.g., a single port RAM), and accesses are multiplexed. Still other shared memory topologies may be readily implemented by those of ordinary skill, given the contents of the present disclosure.

During operation, the first processor 302 allocates the one or more TDs to the TR 306 via link 352 and notifies the second processor 308 (e.g., ringing a doorbell, writing to an array or message signaled interrupt (MSI), etc.). At a later point in time, the second processor 308 may read the TDs that are queued for processing in the TR via link 354. The second processor reads the TDs and/or dereferences the TDs to the corresponding locations that are pointed to by the TDs (held in the backing buffers). After the second processor reads/writes the data or payloads into/from the backing buffers, the second processor updates a status associated with the transaction (e.g., indicating a success, fail, or overflow) on the TR. The second processor also updates a tail index of the TR. The status merely refers to the status of transfer between the first and second processor.

In various embodiments, the data may be consumed and/or transferred elsewhere "upstream" via a communication link 356 (e.g., another IPC link, a wireless or wired interface) toward an intended destination, e.g., a peripheral device or an access point. In some variants, the data may be consumed, rendered, or otherwise processed or used by the baseband. For example, the transferred data may include text, audio or video data that is played by the user equipment 300. In yet other variants, the data is transferred to another, third independently operable processor (not shown), which may reside in the user equipment 300, or in another user equipment (not shown).

FIGS. 4A-4D depict exemplary implementations of in-place transactions and/or exemplary data structures, for an inter-processor communication (IPC) link.

Figure 4A:
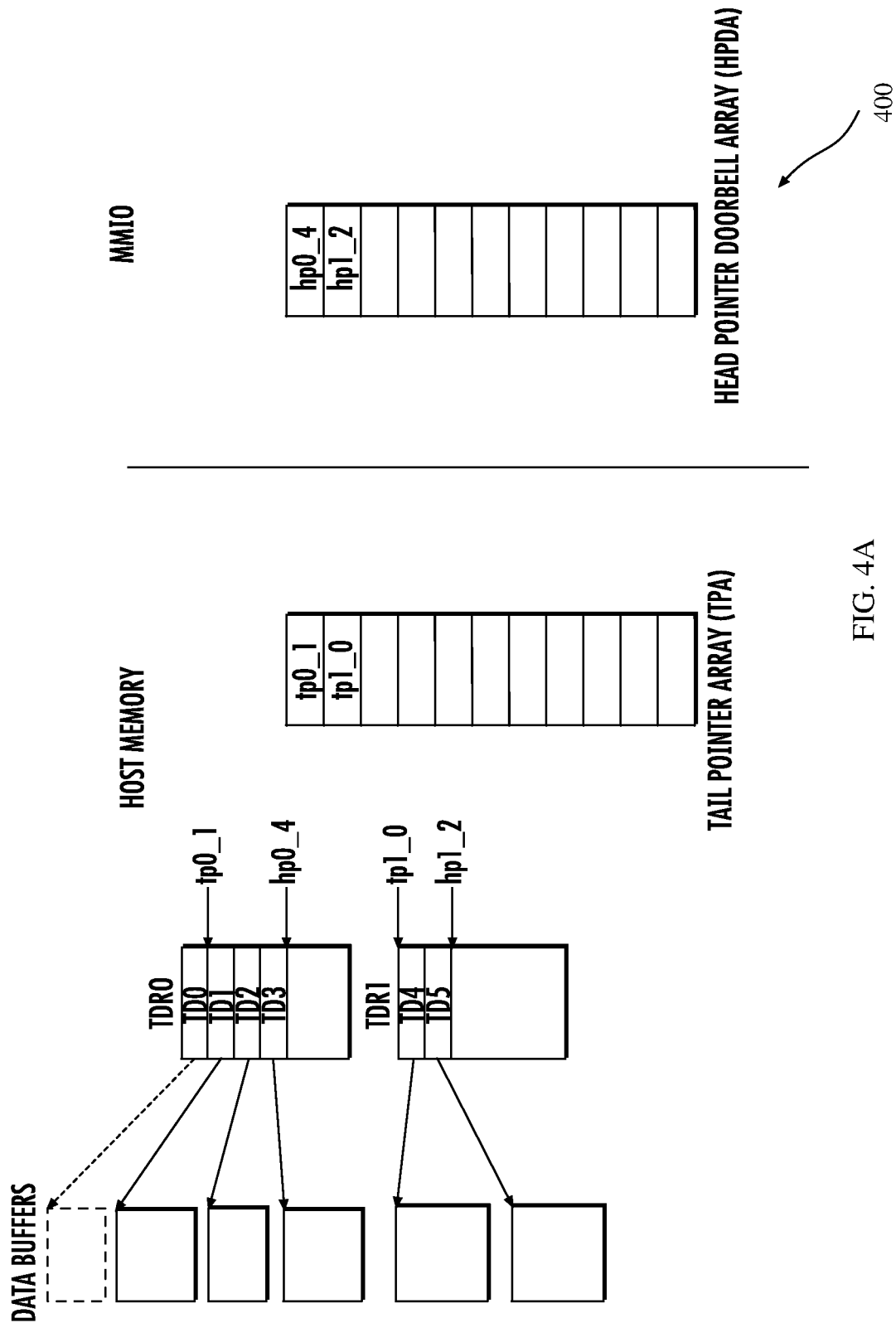
FIG. 4A illustrates exemplary data structures used during in-place completion operation.

Referring now to FIG. 4A, one exemplary data structure 400 includes a first pipe (TDR0) in the uplink direction (e.g., from a host to a peripheral), and a second pipe (TDR1) in the downlink direction (from the peripheral to the host). As shown, the host processor has queued four (4) TDs in TDR0 for uplink transfer and informed the peripheral processor by writing the address (hp0_4) at the TDR0 head pointer offset in the head pointer doorbell array (HPDA) slot 0. After the peripheral processor has read the data buffers associated for TD0, it updates the tail pointer array (TPA) entry (slot 0) by writing a new tail pointer address (tp0_1). When the peripheral processor updates the appropriate TPA entry, the host infers that the data buffer has been read and can free the corresponding data buffer from memory.

Similarly, as shown, the host has queued two (2) TDs in TDR1 for downlink transfer and informs the peripheral processor by writing hp1_2 at offset slot 1 in HPDA. Once the peripheral processor fills the data buffers associated with these TDs, it will update TPA to inform the host by writing tp1_0 in offset slot 1. Thereafter the host infers that the data buffers have been filled and can read the corresponding data buffers. After the host has read the data buffers, it may free their memory allocations.

In some implementations, the TDs may be "aggregated" into a larger scatter-gather TD to support so-called "scatter-gather" behavior for large I/O transfers (e.g., each procedure-call sequentially writes data from multiple buffers to a single data stream or reads data from a data stream to multiple buffers; the so-called "scatter/gather" refers to the process of gathering data from, or scattering data into, the given set of buffers.)

Figure 4B:
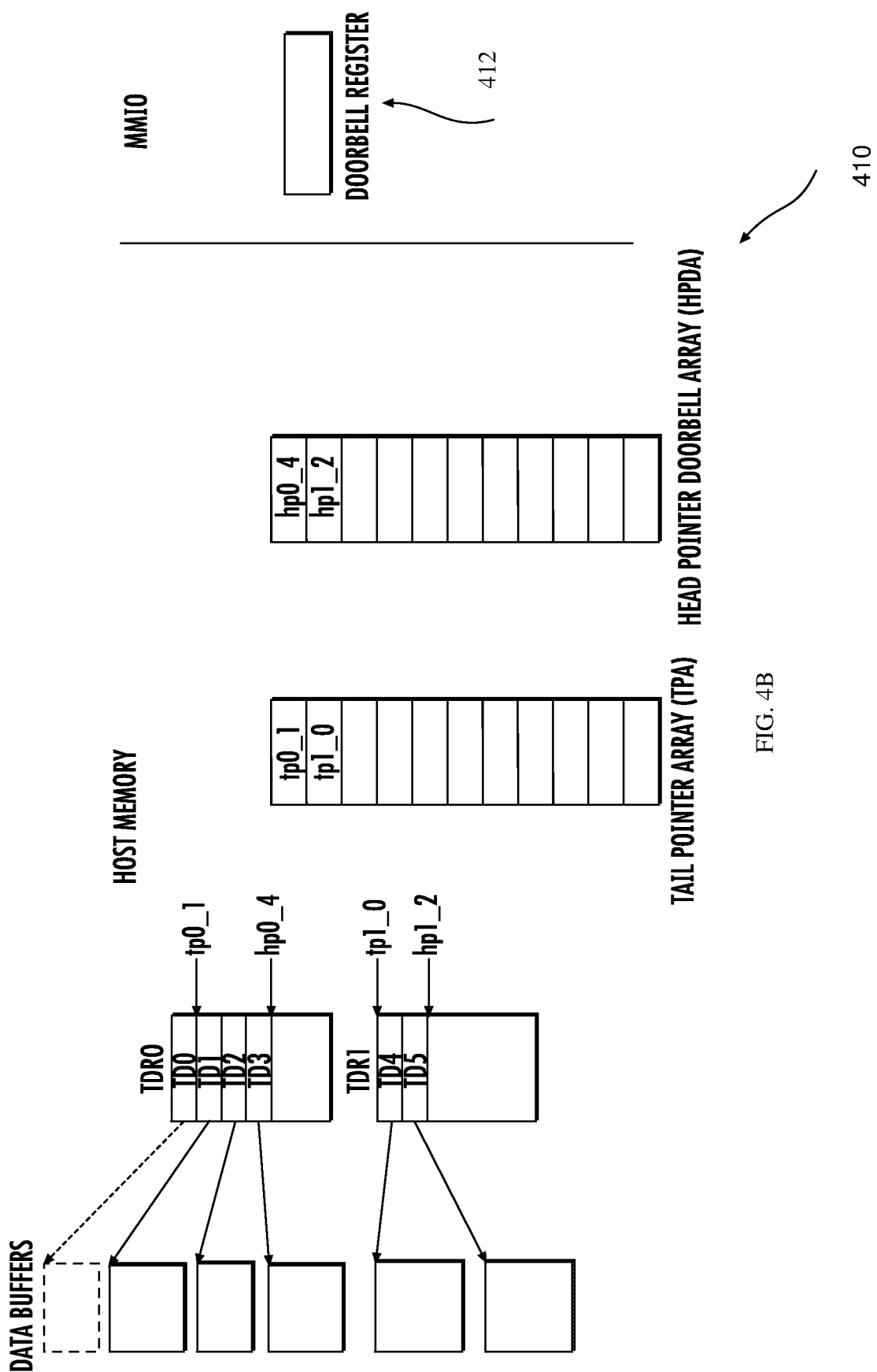
FIG. 4B illustrates other exemplary data structures with a doorbell register, used during in-place completion operation.

FIG. 4B illustrates an alternate exemplary data structure 410, with a so-called "doorbell register" 412 disposed in the MMIO, and the doorbell array disposed in the host processor (e.g., application processor).

Figure 4C:
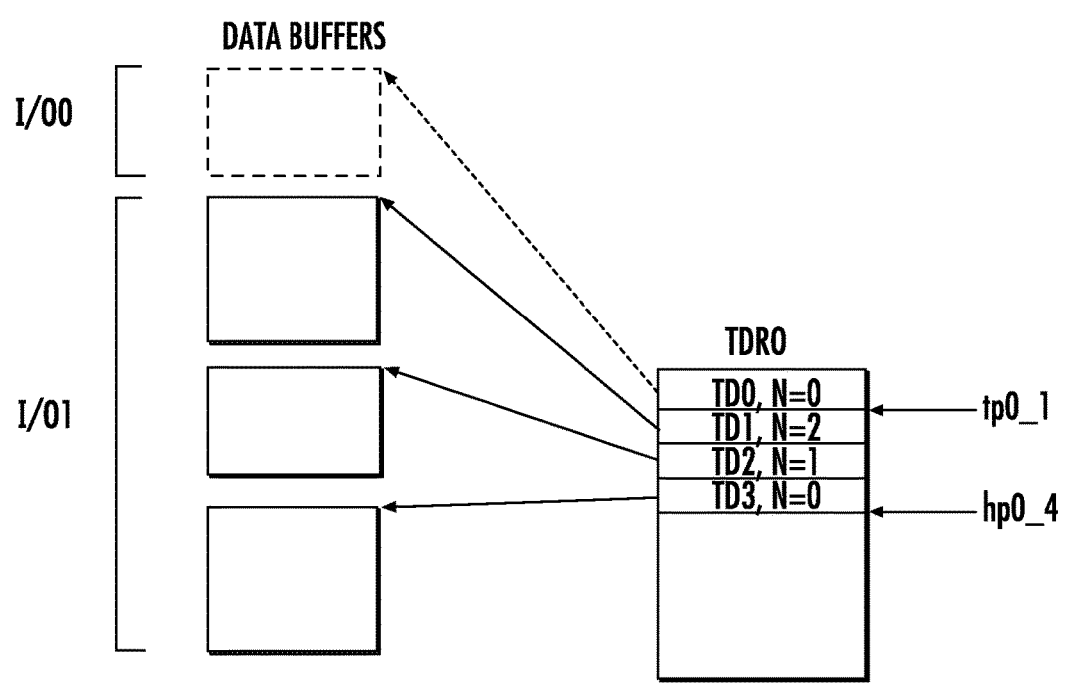
FIG. 4C illustrates one exemplary scatter-gather transfer descriptor, used during in-place completion operation.

FIG. 4C illustrates one exemplary scatter-gather TD 420 which is described by three (3) TDs according to an exemplary "scatter-gather" scheme. Each TD indicates the remaining count of TDs in the aggregate scatter-gather TD. For example, as shown, I/O1 includes TD1 which continues to TD2 (two (2) TDs remain e.g., N=2), and TD2 continues to TD3 (one (1) TD remains N=1), which is the last descriptor in the transfer (N=0, no remaining TDs). Each TD contains a pointer to the data buffer in host memory (indicating the address to be accessed by the peripheral to perform the data transfer) and a size field (indicating the size of the data transfer). For uplink TRs, the size field is read-only for the peripheral, whereas for downlink TRs the size field may be read/write for the peripheral. During a downlink transfer, the peripheral reads the size field to determine the maximum size of the buffer available. After the downlink transfer, the peripheral may update the size field with the actual size of data written into the buffer.

In the foregoing "in-place" mechanisms, the host processor infers that the access of data has been completed by reading the updated tail index and/or status generated by the peripheral processor. Notably, the in-place mechanism is a "fire-and-forget" scheme. That is, the host may send the TDs to the shared memory and the peripheral may process the TDs from the shared memory without further coordination. In-place transfer can provide efficient data transfer where the processors do not need to coordinate data transfer.

However, some data applications require coordination between the processors. For example, the host processor may need to guarantee a particular transaction time and/or transaction order. For such scenarios, the in-place scheme does not provide enough information to the host processor. More directly, there is no explicit completion acknowledgment mechanism with the in-place scheme, thus the host does not receive affirmative knowledge that the TDs were received and processed by the peripheral processor, that the TDs were received in order, received completely, and/or received with no corruptions. In other words, in-place completion assumes a First-In-First-Out (FIFO) memory buffer allocation; i.e., the buffers are freed in the order that they were first allocated. FIFO based operation is simple and efficient to implement, but is not suitable for all applications.

In-Order Completion Protocol

The following discussion describes exemplary embodiments of protocols for acknowledgement of completion of transaction of data over an inter-processor communication (IPC) link between two (or more) independently operable processors. In one exemplary embodiment, the acknowledgement of completion includes multiple acknowledgements. More specifically, the following discussion is directed to bus transactions that optimally implement completion mechanisms that explicitly indicate transaction completion of data as intended, and ensure integrity (e.g., ordering) of the transferred data. The following so-called "in-order" completion protocol uses completion descriptors (CDs) to ensure completion of TD transactions.

In-order completion offers different capabilities over in-place transfer (discussed above with respect to FIG. 3). Specifically, in-place transfer (e.g., FIG. 3) efficiently performs data transactions by allowing the first processor to independently infer that the information contained in the transmitted TDs has reached its intended destination without requiring explicit overhead for confirmation by the second processor. In contrast, in-order completion provides certainty that the data sent by the first processor has been processed to completion via the second processor, as discussed below. In order to reduce messaging overhead, an exemplary variant further groups completion descriptors together (rather than individually signaling each completion.)

Figure 5:
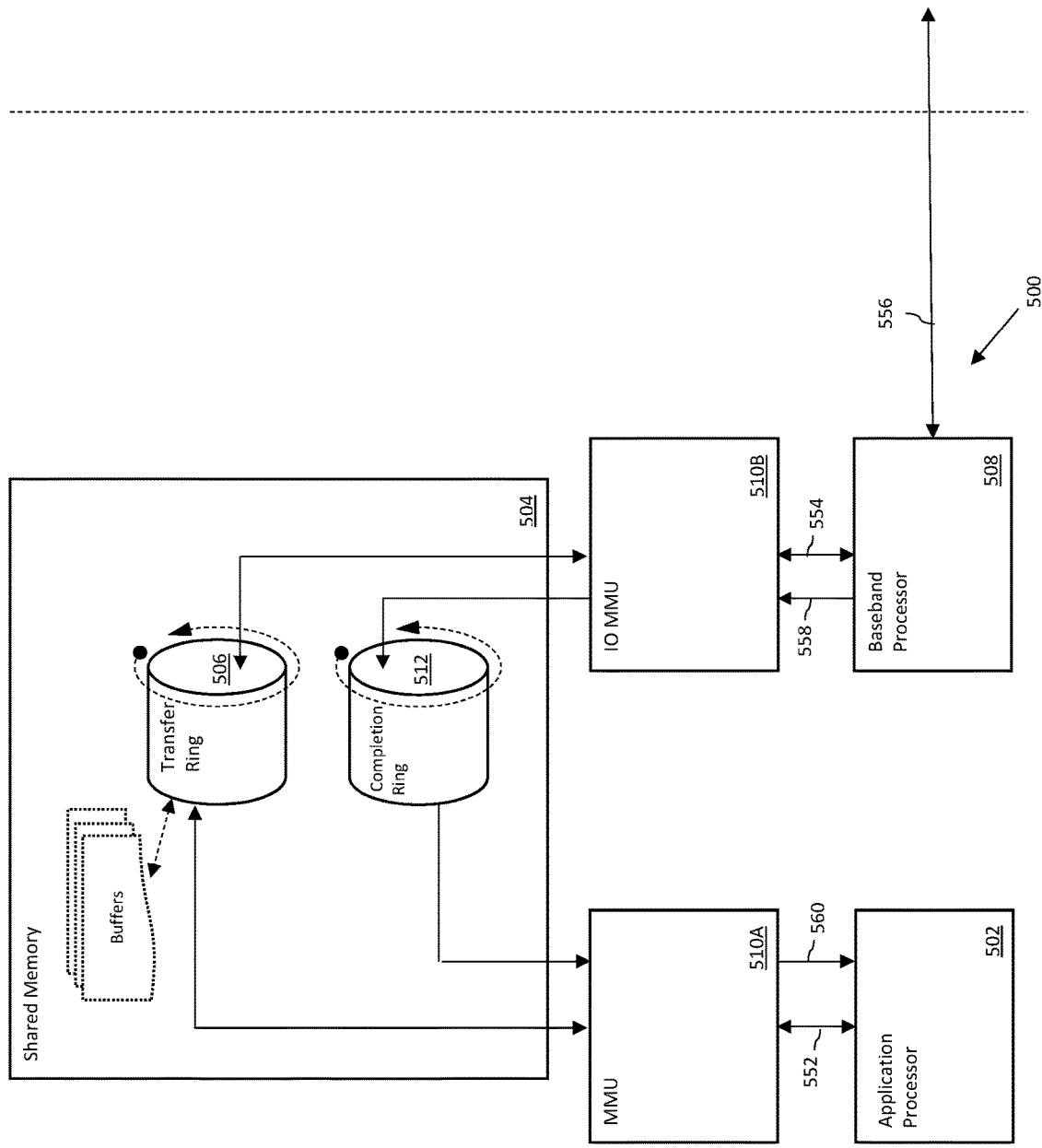
FIG. 5 illustrates a generalized memory layout, useful for illustrating in-order completion described herein.

FIG. 5 illustrates one exemplary "in-order" transmission protocol for data transactions between two or more independently operable processor apparatus, via the use of transfer descriptors (TDs) and completion descriptors (CDs) in a shared memory.

During "in-order" completion operation, a first processor 502 of the independently operable processors (e.g., a host processor or application processor) allocates TDs within a shared memory apparatus 504 and notifies the other second processor 508 (via ringing a doorbell, writing to a pointer array or message signaled interrupt (MSI), etc.).

The data may be stored in or written into backing memory buffers that are represented by one or more TDs. In some variants, the data may be contained in the TDs themselves, and the TDs are delivered to and written to the shared memory 504 via communication link 552 (e.g., an IPC link and corresponding MMU 510A). Specifically, the data may comprise a payload or information that is to be delivered to the peripheral and/or another device or network entity. In some variants, the data may reside in an external memory, and the one or more TDs may contain data that points to the location in the external memory. The TDs may be placed into a transfer descriptor ring (TR) data structure 506 that resides in the shared memory 504. In one implementation, the first processor 502 may write to a head index that resides in a host-side memory 504, indicating transfer of the TDs.

At a later point in time, the second independently operable processor 508 (e.g., a peripheral processor or baseband processor) reads the TDs on the TR 506 via communication link 554 (e.g., via IO MMU 510B), and reads data from, or writes data into, the backing buffers associated therewith. For example, the second processor 508 reads the TDs and/or dereferences the TDs to the corresponding data or payloads that are pointed to by the TDs. Unlike the "in-place" completion scheme of FIG. 5, the second processor does not provide transfer status "in-place" in the TR. Instead, the second processor 508 uses explicit completion descriptors (CD) in a completion descriptor ring (CR) 512 to indicate completion status. More directly, the memory or buffer that is pointed to by the TD/TR cannot be freed by the first processor until the corresponding CD/CR has explicitly identified the completion status.

The second processor 508 may access, write, pad, use, transmit, discard, and/or otherwise consume the data. For example, the second processor 508 may transmit the data via another communication link 556 (e.g., a wireless link, another IPC link) to another device. In one variant, the second processor 508 may transmit the data upstream to another device via a modem resident (or in data communication with) the second processor. The other device may be wireless devices such as wireless earbuds, a wireless computer mouse, mobile user device, and/or other wired or wireless device.

In several implementations, the modem is a wireless modem implementing one or more wireless protocols. A person having ordinary skill in the relevant art will recognize that various types of modems may be used according to the present disclosure, e.g., Wi-Fi modem, cellular modem, mobile broadband modem, Bluetooth modem, NFC modem, RFID reader, and/or other short-range and long-range protocols as noted above. In other implementations, wired communication may be possible with the second processor 508, e.g., via an interface capable of wired communications.

In another variant, the second processor may directly render or cause another apparatus in the user equipment 500 to render the data (e.g., audio or video data) and play or display the data for user consumption. In another variant, the data may be sent to a third independently operable processor (not shown) that resides on the user equipment 500, or on another user equipment (not shown).

To acknowledge a completion of the data transaction, the second processor 508 may then write one or more CDs to a completion descriptor ring (CR) 512 that resides on the shared memory 504, via communication link 558 (e.g., another IPC link or part of the same IPC link 552 or 554). The first processor 502 may read the CDs on the CR 512 via communication link 560 (e.g., another IPC link or part of the same IPC link 552, 554 or 558) to verify the completed data transaction. The CDs contain information that explicitly indicates to the first processor (i.e., the processor that originated the TDs) that the data has been processed by the second processor 508 and that the memory allocation for the TD/TR can be freed. For example, a given CD may include an identifier of which TD(s) the peripheral retrieved and completed, and/or the address of the buffer accessed to retrieve the data or payload.

As previously alluded to, various embodiments of the present disclosure further aggregate multiple transfer completions into a single CD. In other words, the peripheral processor may decide not to generate a completion for a buffer even upon successful transfer completion. For example, when the peripheral processor reads and processes TD0, the peripheral processor may elect not to immediately generate CD0 indicating completion. Instead, the peripheral processor may aggregate the completion acknowledgement with other TDs. In this manner a single CD can correspond to many TDs. In one such variant, a single CD can complete all of the sequentially ordered TDs which have not yet been completed (e.g., CD1000 may complete TD1000 and any TDs that have not yet been completed sequentially.)

Various embodiments of the present disclosure process the TR and CR sequentially. In other words, the first processor queues one or more TDs within the TR in a specific order. The second processor retrieves and completes the queued TDs in the same order. In other words, the second processor completion mechanism ensures that the second processor has completed the transactions of TDs in the same order ("in-order") that the first processor placed them in the TR.

While the present discussion is presented within the context of a successful completion for illustrative clarity, completions may not always be successful. Common examples of other types of completion information include, without limitation: invalid, partial transfer (PT), end transfer (ET), overflow, block overflow, abort, and/or error.

Variants which utilize aggregated completions may be "distributive" in nature; for example, a CD that completes multiple TDs may distribute the status to all of the TDs (e.g., a success status indicates that all TDs succeeded, a fail status indicates that all TDs failed). Another variant may treat aggregated completions as "conditional" in nature; for example, a CD that completes multiple TDs with an overflow or a partial transfer status may indicate that the associated TDs are completed (and can be immediately freed) but the status of the transfer may be conditional on e.g., a subsequent CD. In some cases, the subsequent CD can be sent later i.e., non-sequentially (allowing for intervening transfers to be sequentially completed.) More directly, it is appreciated that completion status and reclamation of completed buffers can be decoupled and handled independently.

Still other types of completions may correspond non-sequentially to TDs within the TR. For example, consider a set of TDs that are grouped together sequentially but where a CD includes an "abort status" mid-set. Every TD that corresponds to the remaining TDs of the set can be immediately reclaimed (even though not all TDs have been sequentially processed.) In another such example, an "error status" CD returned mid-set may allow the host processor to either immediately reclaim (treated as an abort), or attempt to queue more TDs for a retry attempt.

Figure 6A:
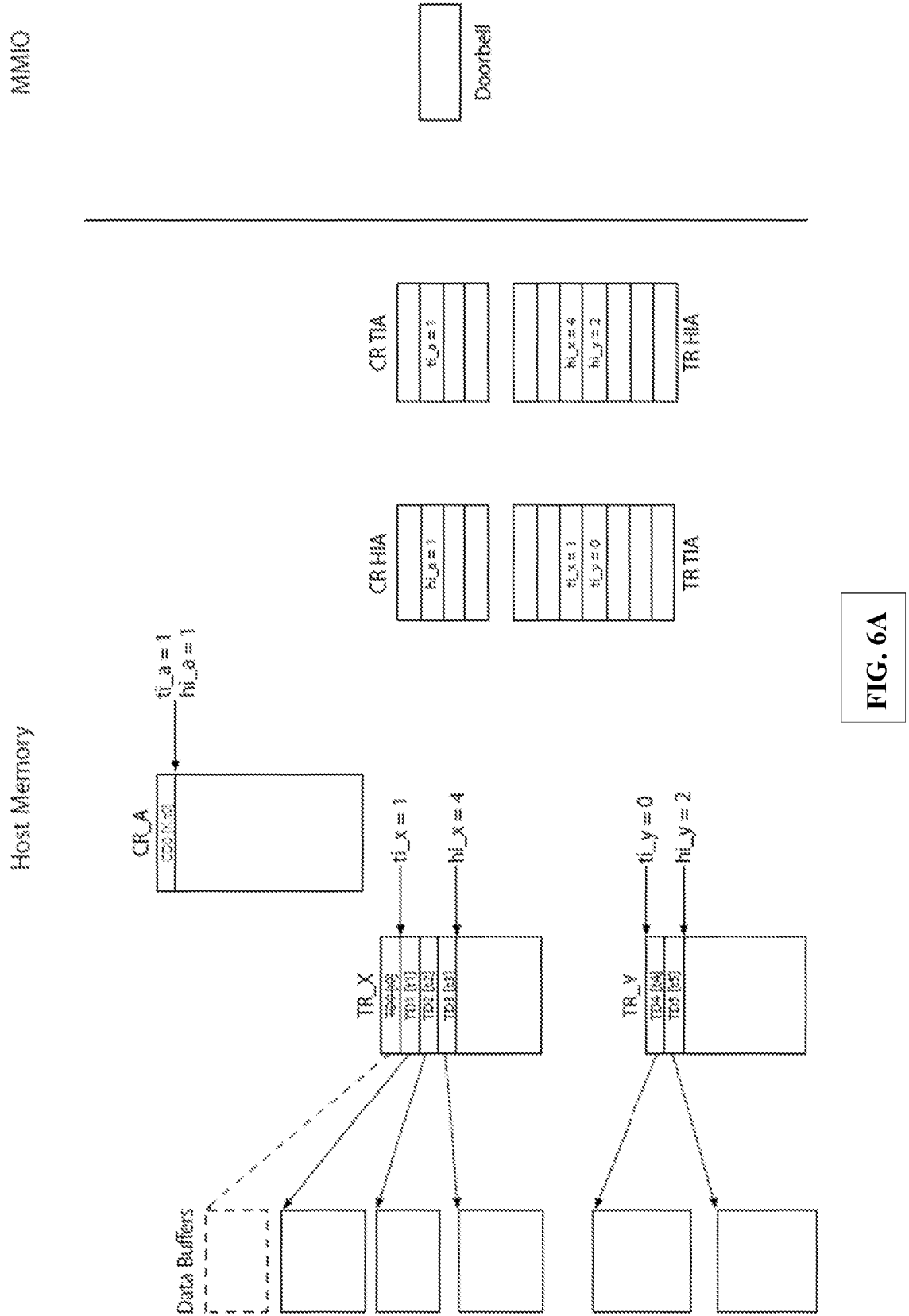
FIG. 6A illustrates exemplary data structures used during in-order completion operation.

FIG. 6A illustrates a memory layout with two TRs shown (represented as queues in unidirectional pipes), TR_X and TR_Y.

During in-order completion operation, a host processor queues TDs and informs the peripheral processor by writing head and tail index entries. For example, as shown, "hi_x=4" and "ti_x=1" indicate three (3) TDs in TR_X residing in host-side memory (or an external memory), and "hi_y=2" and "ti_y=0" indicates two (2) TDs in TR_Y residing in host-side memory. Each TD includes a tag; for example as shown TD[0] includes tag $t_0$, TD[1] includes tag $t_1$, TD[2] includes tag $t_2$, etc.

Subsequently thereafter, the peripheral processor reads the TDs identified within each TR and processes them accordingly. When the peripheral processor has completed the TD transaction, the peripheral processor notifies the host processor of completion via an explicit completion descriptor/completion descriptor ring (CD/CR).

The completion descriptor ring (CR) identifies the transactions that have been completed; the completion descriptor (CD) includes completion status (success, fail, overflow, etc.) for each TD using a corresponding TD tag. For example, as shown in FIG. 6A, the completion ring head array includes a pointer for "hi_a=1" and the completion ring tail array includes a pointer "ti_a=1" to indicate one (1) CD in CR_A residing in host-side memory (or an external memory). The CD includes a tag that corresponds to its completed TD; here CD[0] includes tag $t_0$ that indicates that TD[0] has been completed (e.g., consumed and/or delivered to its intended destination).

After completion, the host processor can free the TD memory allocation.

Figure 6B:
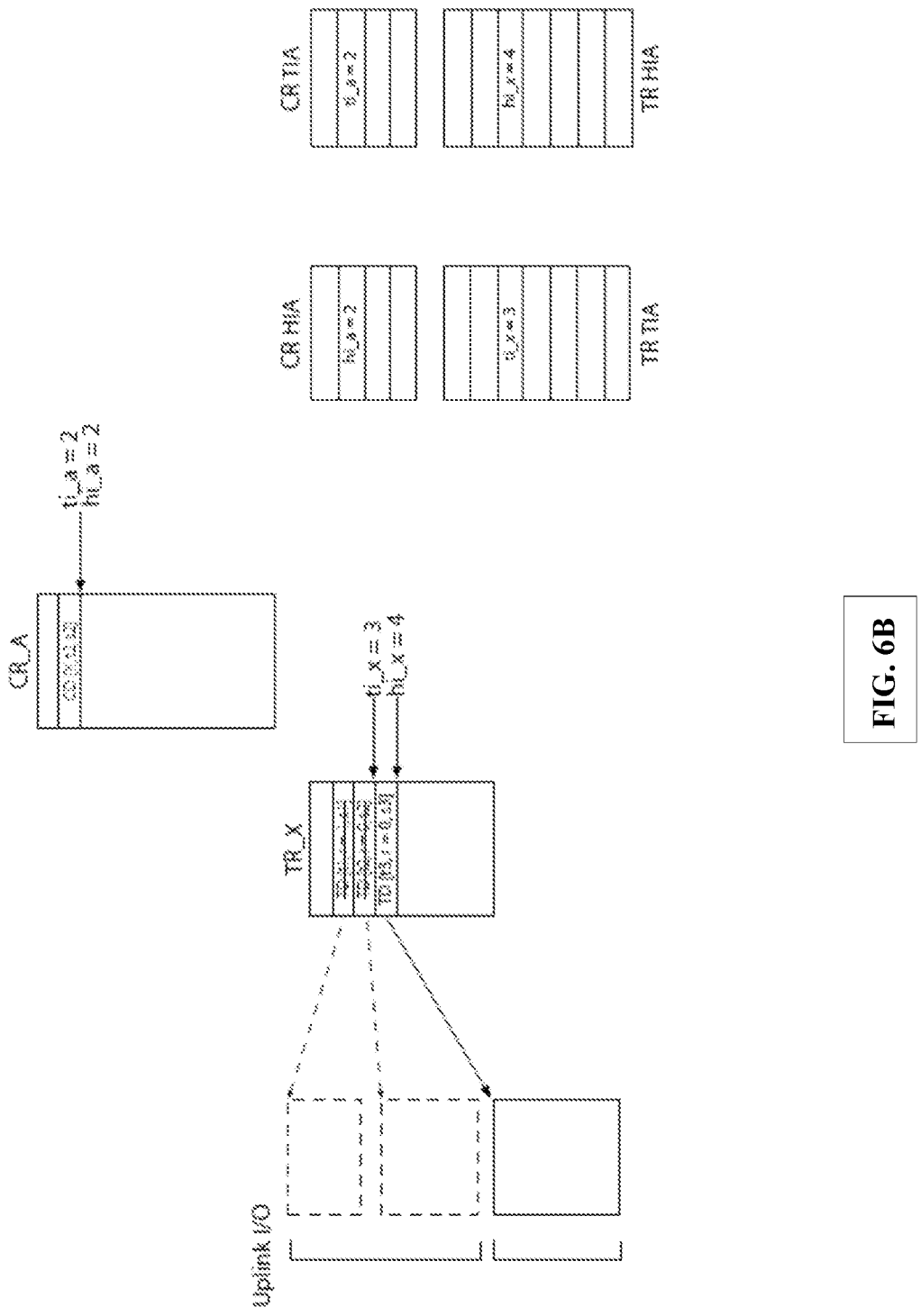
FIG. 6B illustrates exemplary data structures used during in-order completion operation for groups of data transactions.

Referring now to FIG. 6B a memory layout with one TR (TR_X) is shown with an optimized completion.

As shown, the host queued three (3) TDs in TR_X residing in host-side memory (or an external memory). As previously noted, each TD includes a tag; for example as shown TD[1] includes tag $t_1$, TD[2] includes tag $t_2$, TD[3] includes tag $t_3$, etc.

As previously noted, the peripheral processor reads the TDs identified within each TR and processes them accordingly. However, unlike the system of FIG. 6A, the peripheral processor does not immediately notify the host processor of completion when a TD transaction is completed. Instead, the peripheral processor queues multiple completions within a single CD.

For example, as shown in FIG. 6B, CR_A includes one (1) CD that includes TR ID (TR_X), a corresponding tag ($t_2$), Size (e.g., the size of the completed buffer), and a corresponding completion status (end transfer). Based on the optimized completion, the host processor can free both TD[2] (as identified by its tag $t_2$) as well as the number of predecessors identified by size (here, TD[1]).

While not expressly shown in this example, an end transfer CD can result in a "short completion" where the host processor recognizes that the transfer ended with fewer TDs than were initially allocated. For example, if the transfer of FIG. 6B spanned all three (3) TDs, then all three TDs could be reclaimed (even though only two (2) were actually used).

FIGS. 7A-7D further illustrate various snapshots of the memory structure during an exemplary in-order completion operation according to the present disclosure. While the following example of FIGS. 7A-7D is presented in the context of a single completion for clarity, the various steps illustrated therein apply to optimized group completions.

Figure 7A:
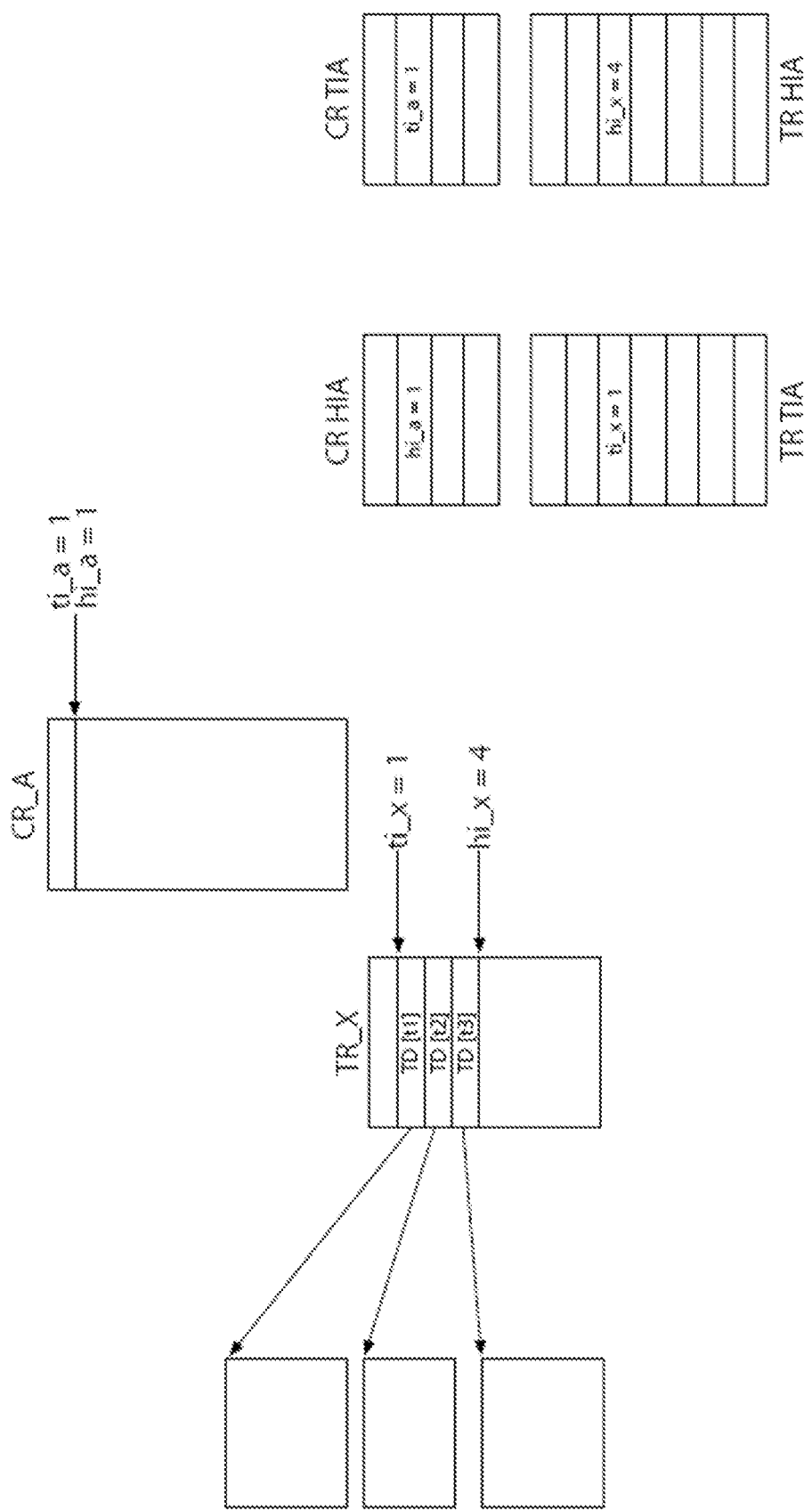
FIG. 7A-7D illustrate various stages of an exemplary memory access, within the context of the system of FIG. 6.

FIG. 7A shows an exemplary embodiment of a steady state (initial state) of a transfer descriptor ring (TR) TR_X for a data pipe X and a completion descriptor ring (CR) CR_A; also shown are corresponding index arrays. TR_X is associated with a transfer ring head index array (TR HIA), a transfer ring tail index array (TR TIA); CR_A is associated with a completion ring tail index array (CR TIA), and a completion ring head index array (CR HIA).

In one embodiment, the described memory structures reside within a host processor memory; however, artisans of ordinary skill in the related arts given the contents of the present disclosure will recognize that the aspects are not so limited. The various data structures (e.g., index arrays and/or memory buffers) may be located on the host-side and/or peripheral-side memory, respectively. In other variants, some or all of the data structures may be located on a shared memory and/or in any other memory accessible by both the host and peripheral processors.

The TR TR_X of FIG. 7A contains three (3) transfer descriptors (TD), with data buffers that are identified by the tags $t_1$, $t_2$ and $t_3$. As shown, the host has written the corresponding indices to identify a TD for processing: e.g., the TR_HIA entry "hi_x" is set to 4. This entry indicates the start of the next TD, and the TR_TIA (which is written by the peripheral; entry "ti_x" is set to 1) indicates the first TD of the current TR to process.

The CR CR_A of FIG. 7A contains zero (0) completion descriptors (CD). Specifically, the completion ring tail index array (CR TIA) "ti_a" is set to 1 by the host processor to indicate that the next CD to process is at slot location 1 of the CR. The value in the completion ring head index array (CR HIA) "hi_a" is set to 1 by the peripheral processor to indicate the next available CD slot location. The peripheral has no outstanding completions because ti_a and hi_a are set to the same value.

Figure 7B:
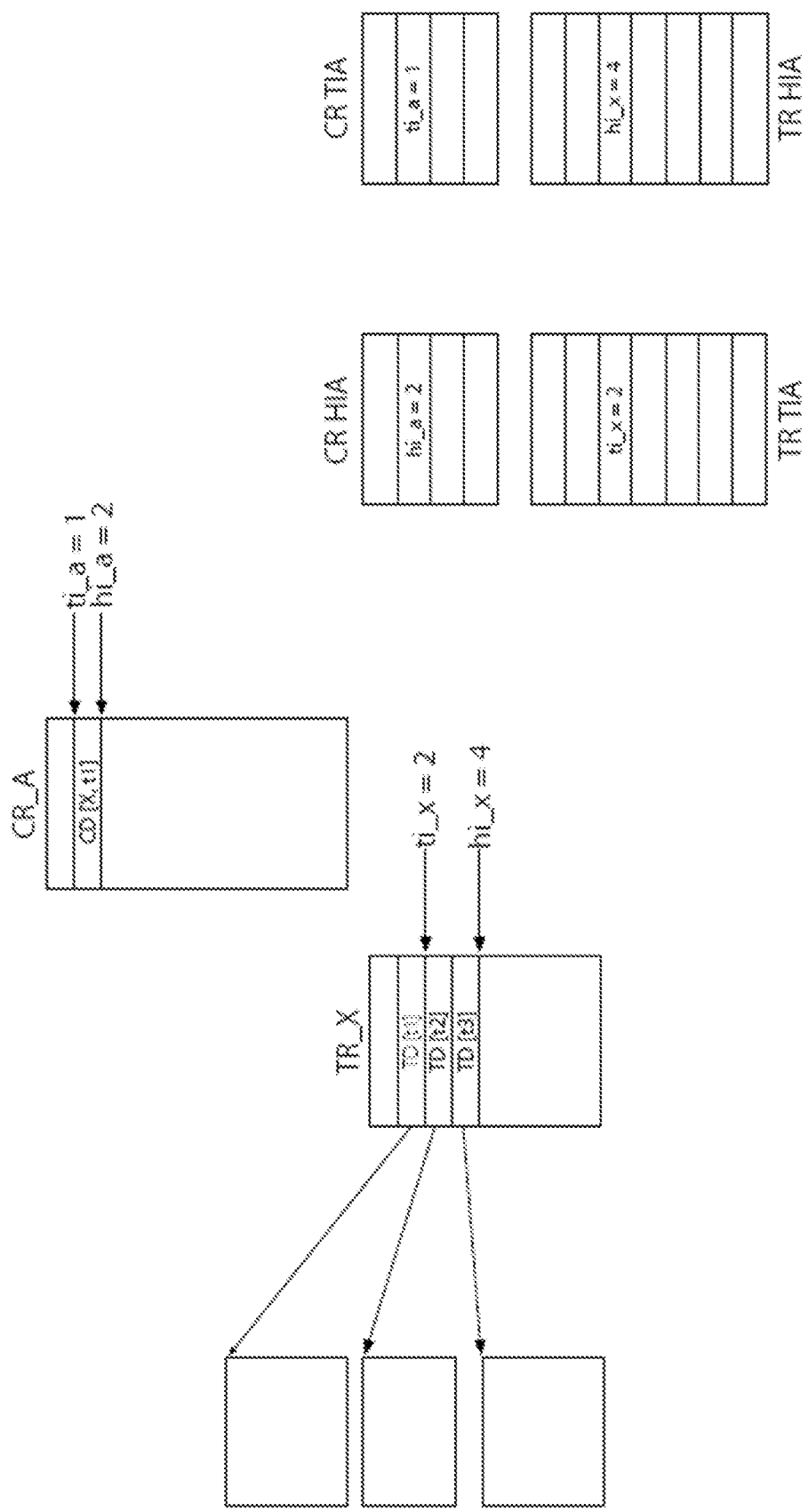

FIG. 7B shows an exemplary embodiment of a peripheral processor processing data buffer TD[$t_1$] (having the tag $t_1$); for example, the peripheral processor may read the data included therein to e.g., transmit the data to a wireless network, or play a media file, etc. As shown, once the peripheral processor has completed processing TD[$t_1$], the peripheral processor creates a CD with the processing status (e.g., invalid, partial transfer (PT), end transfer (ET), overflow, block overflow, abort, error, and/or any other relevant parameters). In some cases, the CD[X, $t_1$] identifies its corresponding TR (here, TR_X) and the tag of the completed TD (here, buffer tag $t_1$). The peripheral processor writes CD[X, $t_1$] into the next available slot (e.g., pointed to by hi_a, index location 1) in CR_A. Once the CD[X] is written into CR_A, the peripheral processor updates CR HIA with the corresponding index. Specifically, the peripheral processor updates the value of "hi_a" of CR HIA to 2. The peripheral has one outstanding completion because ti_a is set to index 1 and hi_a is set to index 2. In order to correctly reflect TR status, the peripheral also updates TR TIA to 2.

In some cases, the peripheral processor may generate a message signaled interrupt (MSI) for the host to notify the host of an outstanding completion; interrupt driven signaling may be preferred for time sensitive or urgent completion messaging. In other cases, the host processor will check the CR HIA and TR TIA according to its own scheduling which may be tuned to e.g., improve performance, reduce processor churn, improve power consumption, or any number of other potential scheduling optimizations. As a brief aside, a message signaled interrupt (MSI) is a mechanism for a processor (e.g., a peripheral processor) to send an interrupt to another processor (e.g., a host processor). In some variants, the MSI may be considered a "doorbell." As used herein, a "doorbell" signal refers to any signal, message, register, or interrupt that is used by one device (e.g., peripheral processor) to indicate to another device (e.g., host processor) that there is some work to be done (data processing, control flow, etc.). The reverse may also be applicable, where the host indicates work for the peripheral. For example, in one implementation, one processor (e.g., the peripheral processor) places data in one or more shared memory location(s), and "rings the doorbell" by writing to a designated memory location (the "doorbell region"). In another implementation, the data may be placed in the doorbell message itself. Responsively, the other processor (e.g., the host processor) can process the data. The designated memory location may include a shared memory structure, peripheral- or host-side buffer, an external memory, or some other mutually accessible data structure or location.

In some alternative variants, a processor may provide an array of so-called doorbell registers, and a so-called head pointer doorbell array (HPDA) which is further indexed by pipe number. In some implementations, the peripheral processor may notify the host processor of a new CD in a CR by writing a head pointer value in the doorbell register at a pipe number offset inside the HPDA. Moreover, in some such variants, the peripheral may also provide a so-called tail pointer array (TPA) that is indexed by pipe number, which is updated by the host with tail pointer values to indicate completion of a CD. The host processor may similarly notify the peripheral processor of a new TD in a TR, and observe updates by the peripheral processor to indicate completion of a TD.

Figure 7C:
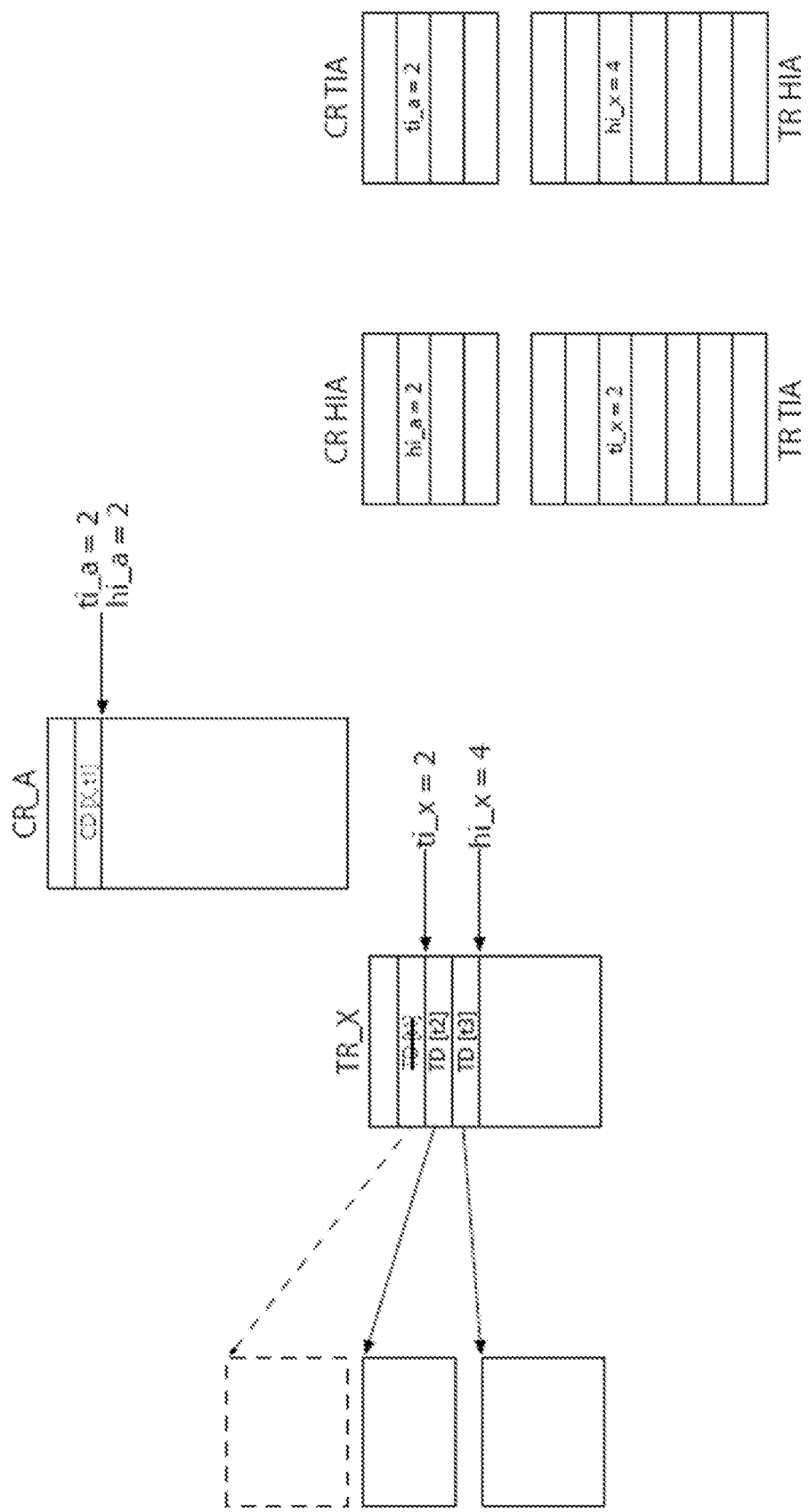

Referring now to FIG. 7C, once the host processor is notified or otherwise determines that a completion is outstanding, the host processor can read the completion descriptor to determine the status of its corresponding transaction. For example, upon receiving a MSI from the peripheral processor, the host processor reads CD[X, $t_1$] from CR_A corresponding to the new hi_a value of 2. CD[X, $t_1$] includes a tag $t_1$, thus the CD corresponds to TR_X and includes the completion status for TD[$t_1$].

Once the host processor determines that data buffer TD[$t_1$] corresponding to tag $t_1$ has been completed by the peripheral processor, the host processor can free the TD[$t_1$] memory allocation. Additionally, the peripheral can update the transfer ring tail index ti_x to 2, and the corresponding TD may be removed from the TR (TR_X), shown by strikeout of TD [$t_1$] in FIG. 7C. Once the host has finished processing the completion descriptor CD[X, $t_1$], the host updates the completion ring pointer tail index ti_a to 2. At this point, the transfer descriptor ring memory associated with TD[$t_1$] is free, and there are no outstanding completion descriptors. In one variant, the host processor may further write to a corresponding doorbell register to indicate to the peripheral processor that there are no outstanding completion descriptors.

Figure 7D:
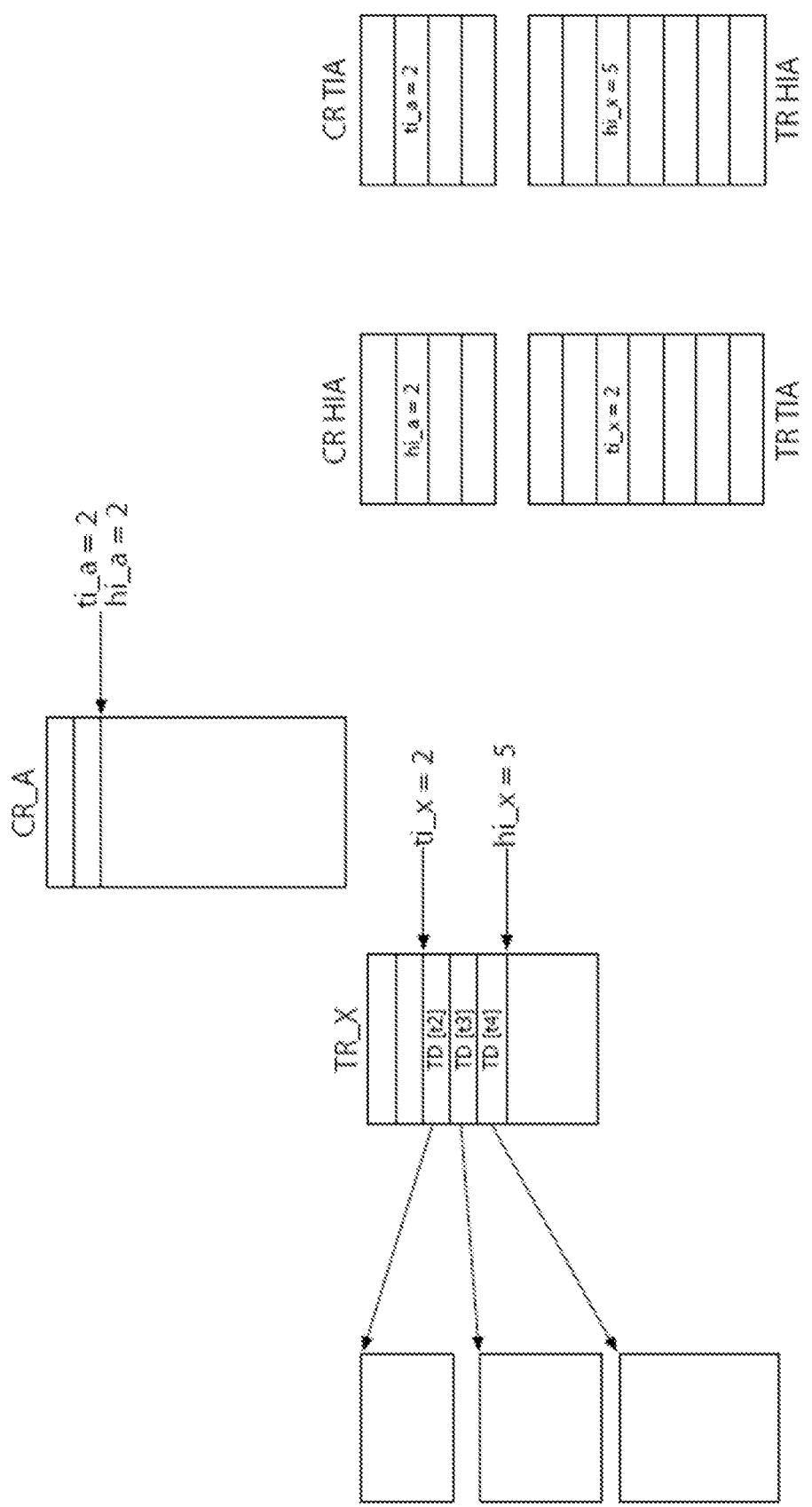

FIG. 7D shows an exemplary embodiment of a host processor queuing a new TD. Upon receiving or generating instructions to transfer more data, the host processor may check whether there is space available in the TR (TR_X). If there is space in the TR, the host processor may generate a new TD that is placed in the next available slot at location 4, previously indicated by "hi_x"=4 (shown throughout FIGS. 7A-7C). To inform the peripheral processor about this newly queued TD, the host processor may update the value of "hi_x" to 5. In one variant, the host may further write to a doorbell register to indicate the update to the peripheral processor. Upon setting "hi_x" to 5, the TR and CR may return to steady state and continue processing CDs in the aforementioned fashion.

In the foregoing discussions of FIGS. 7A-7D, the host processor and the peripheral processor may write to some or all of the index arrays as well as read the values contained therein in order to indicate to each other which TDs or CDs to process and where to write subsequent TDs or CDs. Accounting for the values in the index arrays ensures to the host processor that the data is completed in order, rather than relying on a "fire and forget" mechanism that does not provide completion acknowledgments from the peripheral processor. For example, CDs in the exemplary in-order mechanism contain information about which data or payload(s) were completed by the peripheral processor, and which TR the data originated from. Similarly, accounting for the index values ensures that the peripheral processor reads the correct TDs in the intended order.

In some embodiments, the host processor may place the data (e.g., payload(s)) within the one or more TDs. Specifically, the payload(s) may be placed within a body portion, or a footer or header component of the one or more TDs. As but one example, Bluetooth data may be efficiently transmitted to a Bluetooth-enabled peripheral device in the footer or a header of a TD, as described in, e.g., U.S. patent application Ser. No. 15/865,638 entitled "METHODS AND APPARATUS FOR REDUCED-LATENCY DATA TRANSMISSION OVER AN INTER-PROCESSOR COMMUNICATION LINK BETWEEN INDEPENDENTLY OPERABLE PROCESSORS" and filed Jan. 9, 2018, now U.S. Pat. No. 10,331,612, incorporated supra. A person having ordinary skill in the relevant art will recognize that various other types of data may be encapsulated in the TD according to the present disclosure. Such types of data may include data configured for short-range and/or low-throughput mechanics such as RFID, NFC, etc. In other implementations, Wi-Fi-enabled wireless devices may also send and receive packets encapsulated within TDs. The peripheral processor may then read the data of the payload in the TDs, directly from the shared memory, and indicate completion thereof according to the foregoing descriptions.

In other embodiments, IPC transactions may use processor-side cache, an external memory module, or other types of dedicated memory to carry data, as opposed to using a shared memory buffer to directly transmit data from one processor to another.

In one variant, a given TD may contain information that points to data residing on an external memory such as DRAM (rather than encapsulating the data). After the host processor places a TD into the TR, the peripheral processor may then read the TD and retrieve data from the external memory. Although pointing to external memory may increase transaction times because of an extra transaction (e.g., by virtue of the peripheral processor programming a direct memory access (DMA) to the external memory), this variant may allow streamlined communication of bulk amounts of data or low-latency data requiring large amounts of memory (e.g., video).

Methods

The following discussion describes methods for indicating completion of a data transaction between two (or more) independently operable processors according to the present disclosure. In one exemplary variant, the signaling is further optimized for completion of groups of data transactions.

FIG. 8 illustrates one exemplary method 800 for acknowledging by a first processor apparatus a completion of one or more data transactions with a second processor apparatus.

At step 802, a first processor apparatus reads one or more data structures. In one exemplary embodiment, the one or more data structures are provided to the first processor apparatus from a second processor apparatus. In one exemplary embodiment, the one or more data structures are representative of data to be transmitted further to another device such as an external peripheral device (e.g., mouse, another user device) and/or an access point. In another embodiment, the one or more data structures may be processed or rendered by the first processor apparatus for e.g., playing as audio, text, a user interface element, etc. That is, the data structures may be directly consumed by the peripheral processor. Various other forms of data transactions and/or data consumption may be substituted by those of ordinary skill in the related arts given the contents of the present disclosure, the foregoing being purely illustrative.

As used herein, the term "data structure" refers without limitation to any particular schema for organizing and storing data such that it can be accessed and modified. A data structure is generally characterized by one or more of: (i) the collection of data elements, (ii) the relationships between the various data elements (if any), and (iii) the functions or operations that can be applied to the data. Common examples of data structures include without limitation scalars, records, vectors, arrays, multi-dimensional arrays, linked lists, hashes, union, classes, buffers, circular or ring buffers, FIFO (first in, first out) buffers, LIFO (latest in, first out), graphs, trees, and/or any other structured data.

In the exemplary embodiment, the one or more data structures include one or more transfer descriptors (TDs) that are stored within a transfer descriptor ring (TR), where the TDs may additionally describe one or more backing memory buffers. In one such variant, the TDs, TRs, and/or backing memory buffers are read, stored, and/or written from a shared memory module. For example, in one such implementation the second processor apparatus reads and/or writes the one or more TDs into the TR.

In one exemplary variant, the TR comprises one or more TDs which are defined based on one or more referential data arrays. In one such implementation, the one or more referential data arrays include a head pointer array and a tail pointer array. Each of the head pointer array and tail pointer array include one or more indices that identify e.g., the position of TDs, point to free space in the TR, and/or indicate which TDs or buffers to process next.

In one embodiment, the one or more data structures may reside within the first processor apparatus' memory. In alternative embodiments, the one or more data structures may reside within the second processor apparatus' memory. In another embodiment, the one or more data structures may reside within a memory buffer that is shared by both the first and second processor apparatuses. In still other embodiments, various ones of the one or more data structures may be stored in either or both of the first and/or second processor apparatus memories. For example, the first processor may receive a set of referential pointers within its own memory structure, which reference data stored within the second processor's memory structure, or vice versa. Still other implementations of the present disclosure may be substituted with equivalent success by artisans of ordinary skill, given the contents of the present disclosure.

For example, in one such implementation, the first processor apparatus is a peripheral processor that receives data structures from a host processor (a second processor apparatus). The one or more data structures reside on a host-side buffer that is readable by the peripheral processor. Placing at least some the TDs within the host memory (e.g., in a TR that resides at the host's local buffer) may reduce the burden on the host processor to manage transfers over an external physical bus (this task can be offloaded to the peripheral processor). In this manner, a host processor can devote more processing resources to other system tasks e.g., user interface, and or general processing burden. Alternatively, placing at least some of the TDs within the peripheral memory (e.g., in a TR that resides at the peripheral's local buffer) may require the host to write the data transfer over the physical bus, however the lower transactional burden can systems with less capable peripheral processors (e.g., commodity components).

In some embodiments, the first processor apparatus is notified by the second processor apparatus when one or more data structures are available for processing. In some variants, the first processor is notified via messaging, an interrupt, or other explicit signaling. For example, the first processor may receive a message signaled interrupt (MSI); in some cases, the MSI may additionally identify the one or more data structures for processing (e.g., the MSI may identify a TR/TD allocation). In other embodiments, the first processor apparatus independently determines when one or more data structures are available for processing and/or when the one or more data structures can be processed. For example, the first processor may periodically poll for any new data structures (e.g., based on changes to a TD/TR and/or other associated data structures). In other examples, the first processor may retrieve new data structures based on e.g., its own considerations and/or application requirements. For example, the first processor may poll for new data structures based on its own power consumption requirements and/or processing limitations. In other examples, the first processor may retrieve new data structures based on a pre-agreed schedule to support application requirements e.g., audio/video streaming, etc. For example, the payload may be scheduled for reception at time intervals for another processor, a local memory buffer, and/or an external memory module.

In some embodiments, the processing is based on a packet based protocol. In one such variant, the packet based protocol is delivered via a pipe (data stream) of an inter-processor communication (IPC) link. In one exemplary variant, the pipe of the IPC link is represented by a transfer descriptor ring (TR) including one or more packets stored within one or more transfer descriptors (TDs). In alternative embodiments, processing is based on a stream based protocol e.g., a direct memory access (DMA). Unlike packet based protocols which send data via in distinct packets, a stream based protocol sends a continuous flow of data (e.g., not discrete units of data).

As a brief aside, data (payloads, packets, TDs, and/or any other structured data) may vary widely in size between different applications. However, different data structures may have size constraints to e.g., reduce complexity and/or simplify design constraints. For example, packets may be maximally sized at 1500 Kilobytes (Kb) so as to minimize packet routing hardware complexity within the context of IEEE 802.3 Ethernet frames.

In another example, a TD may be optimally sized at 2 Kb so as to simplify memory management within the host and/or peripheral processors. Within this context, data structures may be joined together to form larger data structures, such that virtually any size transaction may be handled. For example, a TR that has linked TDs can transfer larger payloads to suit so-called "jumbo" frames (Ethernet frames with more than 1500 bytes of payload, the size set by the IEEE 802.3; generally, jumbo frames are specifically suited for certain products and services). For example, linking four (4) 2 Kb TDs can transfer up to an 8 Kb jumbo frame. Completions may either individually complete each TD (e.g., four (4) CDs that directly correspond to the four (4) TDs), or complete the set of TDs in aggregate using overflow type completions (e.g., a single CD status provides a "distributive" status for all four (4) blocks).

In one embodiment, the one or more data structures are read over a bus linked to the peripheral processor interface. The bus interface may be singly mastered or multiply mastered. In one such variant, the bus interface is an IPC link. In various embodiments, the IPC link may include a pair of unidirectional pipes or a bidirectional or multidirectional pipe. Other examples of a bus interface usable with the present disclosure include without limitation, Peripheral Connect Interface (PCI), PCI-Express (PCIe), Small Computer System Interface (SCSI), Thunderbolt, FireWire (and other implementations of IEEE 1394), Universal Serial Bus (USB) and variants thereof (e.g., USB-C, Micro-USB), and any other high speed bus interface. In alternative implementations embodiment, the one or more data structures are read via an internal peripheral processor bus. For example, the data structures may be DMA'd (direct memory access) to the first processor memory by e.g., the second processor. Subsequently thereafter, the first processor reads the one or more data structures via its internal memory bus. Various other techniques for reading data structures may be substituted by those of ordinary skill given the contents of the present disclosure.

At step 804, the first processor apparatus may process the one or more data structures. As used herein, the term "process" and/or "processing" refers to a series of finite actions and/or steps taken in order to achieve a particular end and/or result. A process may be executed by a processor, dedicated hardware, and/or any other form of logic that performs logical operations. Examples of processing alternatives include, without limitation, reduced instruction set computer (RISC) processors, complex instruction set computing (CISC) processors, field-programmable gate arrays (FPGAs), application specific integrated circuits (ASICs), and programmable logic devices (PLDs).

In one exemplary embodiment, processing the one or more data structures includes transmitting data in the data structures or receiving data for filling the data structures. For example, the first processor apparatus of a user device may wirelessly transmit the data to another device external to the user device, such as a wireless peripheral device (e.g., mouse, keyboard, earbuds, smart home device), another independently operable processor (e.g., a third processor other than a host or a peripheral), and/or an access point.

It will be appreciated from foregoing discussions that the first processor may include (or be in data communication with) a wireless baseband modem that is configured to send and/or receive data with such peripherals and access points or other network entities via short- and/or long-range protocols. Examples of these wireless communication protocols include but are not limited to Wi-Fi, Bluetooth (including Bluetooth Low Energy (BTLE)), cellular, infrared, radio-frequency identification (RFID), near-field communication (NFC), cellular, Wi-Fi, and Global Positioning System (GPS). In various implementations, the first processor may be a baseband processor capable of one or more of these types of wireless communication. Persons having ordinary skill in the relevant art will recognize that various wireless communication protocols may be enabled depending on the hardware (e.g., types of baseband modem). In some implementations, the baseband processor may be capable of utilizing a plurality of wireless protocols but may selectively enable only a subset thereof, using booting mechanisms as discussed in, e.g., co-owned U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" filed Oct. 8, 2015.

Various wireless device-specific implementations may be possible based on the peripheral device that the baseband modem is transacting data with. Examples include a media application (e.g., earbud, headset, speaker peripherals), data input (e.g., computer mouse, keyboard), computing and home appliances (e.g., printer, thermometer, TV), and monitoring and synchronization of data between one or more of the foregoing. Depending on the number of data structures and/or amount of data that is read from the data structures (which may continue to be populated with additional data structures by e.g., the second processor apparatus), some embodiments may also enable processing and/or transfer of larger data, such as images, animations, videos, and documents.

Moreover, while the foregoing discussion is presented in the context of wireless communications, the various principles described herein are not so limited. In one exemplary embodiment, processing the one or more data structures includes processing the data structure within a media application for e.g., playback, capture, and/or rendering. Common examples of media applications include audio codec operation, video codec operation, human interface operation (e.g., touchscreen, keyboard, mouse, headset, and/or any other human interface peripheral). Persons having ordinary skill in the relevant art will recognize that various media interfaces may be enabled depending on the hardware (e.g., displays, speakers, microphones, and human interface elements, both indigenous to the device and/or externally coupled to the device).

Hence, in some embodiments, the first processor may consume or process the one or more data structures. That is, the payload data within the data structures may be used directly by the user device. For example, the payload data may comprise audio data that is played via a speaker or wired headphones. Alternatively, the payload data may comprise an image that has been rendered or processed by the first and/or second processor. The payload data may include instructions to display or modify a user interface. The payload data may also comprise video data to be displayed on the user device.

Combinations of the above may be processed and/or transacted concurrently. In other embodiments, the application may hybridize one or more subsidiary applications. For example, in some cases an application may include both wireless communication and media application aspects. As one example, a wireless-enabled touchscreen device may require both wireless and rendering functionalities (e.g., video codec operation). In another example, a Short Messaging Service (SMS) may require both limited cellular functionality and user interface functionality. Still other common variants may combine various wireless capabilities (e.g., Wi-Fi with cellular and/or short-range protocols such as Bluetooth) with user applications (e.g., gaming, web surfing, etc.)

In one exemplary embodiment, the first processor processes the one or more data structures independently of the second processor. More directly, the first processor processes the one or more data structures without requiring the second processor to provide e.g., task scheduling, clock, power, processing code, or other logic. In other words, the first processor's processing of the one or more data structures is isolated from the second processor. This enables the second processor to e.g., switch to other tasks and/or transition into various power-conserving modes while the first processor is processing the data structures.

Alternatively, the first processor processes the one or more data structures in conjunction with/or concurrently with other related tasks of the second processor. In one such embodiment, the first processor processes the one or more data structures according to scheduling requirements set forth by the second processor. For example, a baseband processor may be required to transmit data to a wireless network at a specified time interval in order to ensure that certain application requirements (running at an application processor) are met. Still other implementations may require that the first and second processor share one or more of e.g., clock, power, processing code, or other logic. In some cases, the first and second processor dynamically adjust the amount of data that is processed according to e.g., load balancing, power consumption, performance requirements, and/or any number of other system wide considerations.

Artisans of ordinary skill in the related arts will readily appreciate that a data structure may not directly map one-to-one to a process. One or more data structures may be used by one or more processes. Moreover, each process may include sub-processes and/or be subsumed within a larger process or activity. For example, a continuous streaming video may be rendered from multiple video data structures, each of which is processed via a series of smaller discrete processes (e.g., rendering its constituent video frames, motion prediction, image interpolation, etc.) Similarly, a single data structure may be used within multiple sub-processes.

At step 806, the first processor may return one or more completion data structures to indicate the completion of processing. As used herein, the term "completion" refers to the actual end and/or result achieved by a process of finite actions and/or steps. A completion may indicate success (all the finite actions and/or steps of the process were performed successfully and/or achieved expected ends and/or results), failure or incomplete (e.g., at least one action and/or step of the process was not performed, did not succeed, or did not achieve the expected end/result), timeout (e.g., at least one action and/or step of the process was not performed within an allotted time), indeterminate (e.g., the process outcome cannot be determined based on e.g., security and/or permissions requirements), error condition, and/or any other information regarding processor execution or status. In one exemplary implementation, the completion information is a value indicates one or more of the following statuses: invalid, partial transfer (PT), end transfer (ET), overflow, block overflow, abort, and/or error.

In one exemplary embodiment, a data transfer process is completed when the one or more data structures is transacted and the transaction has succeeded, failed, timed out, errored, and/or resulted in an indeterminate delivery. For example, consider one or more transfer descriptors (TDs) containing or pointing to data to be transmitted wirelessly by a baseband processor from a transfer descriptor ring (TR). In one exemplary embodiment, the baseband processor reads each TD and attempts to transmit the TD over-the-air. The baseband processor writes back to a completion descriptor (CD) corresponding to at least one TD based on the resulting outcome. For example, a TD that was successfully transmitted is successfully completed; TDs that could not be transmitted are flagged with a completion that indicates e.g., failure, timeout, error, or other status.

In another exemplary embodiment, a data rendering process is completed when the one or more data structures is rendered, and the data rendering has succeeded, failed, timed out, errored, and/or resulted in an indeterminate rendering. For example, consider one or more transfer descriptors (TDs) containing or pointing to data to be rendered by a graphics processor unit (GPU) from a transfer descriptor ring (TR). In one exemplary embodiment, the GPU reads each TD and attempts to render one or more video frames. The GPU writes back to a completion descriptor (CD) corresponding to each TD based on the resulting outcome. For example, a TD frame that was successfully rendered into a video frame is successfully completed; video frames that could not be rendered are flagged with a completion that indicates e.g., failure, timeout, error, or other status.

Various other forms of data structure processing may be substituted by those of ordinary skill given the contents of the present disclosure. For example, a security processor may receive data structures to be processed for e.g., security authorization within a securely isolated software code base. In some cases, the security processor may provide a successful completion. However, the security processor may not indicate the completion status; e.g., error or timeout information could be exploited by potentially malicious software, etc. Still other forms of data structure processing may be conceived by an artisan of ordinary skill in the relevant art.

In the exemplary embodiment, one or more completion descriptors (CDs) are written to a completion descriptor ring (CR). In some variants the CDs/CR reside in shared memory. In other variants, the CDs/CR reside in either or both of the first and second processors' local memory.

In one embodiment, each CD corresponds to exactly one TD. In other embodiments, each completion descriptor (CD) corresponds to at least one transfer descriptor (TD). In one exemplary embodiment, each CD corresponds to a number of TDs identified by one or more tags. In one such variant, the CD corresponds to any TD identified by the tag and any preceding TDs not explicitly identified therein which have not yet completed; more directly, one or more TDs may be implicitly associated with the explicitly identified TD. In another such variant, the CD corresponds to any TD identified by the tag and any implicitly associated TDs not explicitly identified therein which have not yet completed. For example, associated TDs may be defined by a set. In one such implementation, the set is identified at the time of initial pipe allocation (e.g., a pipe having a number of TDs is allocated.) In other implementations, the set may be identified or otherwise internally managed by host and/or peripheral software.

As previously alluded to, each CD may contain information indicating which TD (e.g., a TD tag), data, or transaction thereof was completed by the processor. In one variant, each CD may include information on a corresponding TD was completed. In another variant, a given CD may include information on multiple TDs that were completed. In still another variant, a given CD may include information on a partial TD that was completed. Various other combinations of one-to-one, one-to-many, many-to-one, many-to-many mappings between CDs and TDs will be readily apparent to those of ordinary skill in the related arts given the contents of the present disclosure.

In one embodiment, each completion descriptor ring (CR) corresponds to exactly one transfer descriptor ring (TR). For example, CDs in a CR may directly correspond to the TDs in the CR's corresponding TR. In other variants, each CR corresponds to at least one TR. For one-to-many CR/TR correspondences, a CDs in a CR may include a tag that identifies which TR the CD corresponds to. In still other variants, many CRs can correspond to one TR. Various other mappings of CR/TR will be readily appreciated by those of ordinary skill, given the contents of the present disclosure.

In some embodiments, the completion data structure may expressly reference the data itself (rather than a data structure). For example, rather than a CD that references a TD (e.g., by tag value, etc.), some completion data structures may identify ranges of data that have been processed. For example, the completion data structure may identify a range of addresses of a region of buffer or external memory containing the completed data, a unique ID that was previously assigned to the data, and/or a combination of both. Common methods for identifying a range of memory include identifying e.g., start address, end address, length, pointer to the next address range (in split ranges of addresses), total count of ranges, total remaining count of ranges, and/or any number of other referential data.

As an aside, as one skilled in the relevant arts may appreciate, completion data structures may be smaller in size than data structures for transfer/processing. In contrast, a data structures for transfer/processing might contain e.g., consumable media data, particularly in the case where the payload is encapsulated in the data structure itself by adding the payload to, e.g., a header, a footer, a body, and/or an address field (according to the delivery mechanisms described in, e.g., co-owned and co-pending U.S. patent application Ser. No. 15/865,638 entitled "METHODS AND APPARATUS FOR REDUCED-LATENCY DATA TRANSMISSION OVER AN INTER-PROCESSOR COMMUNICATION LINK BETWEEN INDEPENDENTLY OPERABLE PROCESSORS" and filed Jan. 9, 2018, now U.S. Pat. No. 10,331,612, incorporated supra).

In one exemplary embodiment, writing one or more CDs to a CR can be performed in a memory allocation that is significantly less than TDs to a TR. For example, in one exemplary embodiment, each exemplary TD describes a physically contiguous buffer in host memory having a maximum size of two (2) kilobits (Kb). In contrast an exemplary CD has a maximum size of one hundred and twenty eight (128) bits, of which sixteen (16) bits can be used to represent consecutive completions (e.g., up to 65535 consecutive completions). In other words, a single CD can be used to complete many consecutive TDs at a fraction of the total memory. As such, in the exemplary embodiment, CRs need not be a large data structure in the shared memory.

In some embodiments, the payload in the CDs may include self-contained messaging. For instance, CDs may encapsulate message signaled interrupts (MSIs) therein that indicate to and/or instruct the other processor to process another CD. In one variant, the other processor increments sequentially to the next queued CD (immediately subsequent to the last-processed CD).

In alternative embodiments, a CD may include one or more referential messaging. For example, a CD may include a pointer to another CD and/or TD. For example, a CD may identify the next CD that has completed and/or the next TD that is being processed. In some other implementations, a CD may include reference to the contents of another CD. For example, a so-called "overflow" CD may be indeterminate by itself, but reference the contents of a prior or subsequent CD for its own status. Thus, both CDs e.g., succeed or fail based on the referenced CD. In some implementations, a "chain" of CDs can reference one another, thereby allowing a single CD to provide completion status for all of the chained CDs.

In some embodiments, CDs/CR may reside in a distinct memory from the TDs/TR. For example, the TDs/TR can be stored within a host processor's memory, whereas the CDs/CR are stored within a peripheral processor's memory. As previously alluded to, different memories have different access latencies for different processors. For example, placing at least some the CDs within the peripheral memory (e.g., in a CR that resides at the peripheral's local buffer) may reduce the burden on the peripheral processor to manage transfers over an external physical bus (this task can be offloaded to the host processor) and vice versa. Other implementations may consolidate the transfer/processing data structure and completion data structure within the same memory; such implementations may be simpler to implement within a single memory controller and/or cheaper to manufacture (e.g., larger memories are less expensive than multiple smaller memories.)

In step 808, the first processor may notify the second processor, thereby causing the second processor to acknowledge the completion. Alternatively, the second processor may check for completions on its own (without requiring an explicit notification from the first processor). More directly, artisans of ordinary skill in the related arts, given the present disclosure, will recognize that explicit notification may be desirable where e.g., the second processor is waiting for completion information. Common examples of such implementations include e.g., time sensitive applications, performance maximization, closely coupled processor scheduling, and/or any number of other potential optimizations. In contrast, non-notification and/or deferred notification may be preferable where e.g., the second processor is not waiting for completion information and can prioritize other system considerations. Common examples of such implementations include e.g., updating background applications, load balancing, reducing power consumption, and/or any number of other potential optimizations.

In one exemplary embodiment, the first processor may generate an interrupt and/or other signaling to notify the second processor of an outstanding completion; interrupt driven signaling may be preferred for time sensitive or urgent completion messaging. In one such variant, the notification comprises a message signaled interrupt (MSI). In some variants, the notification comprises a "doorbell." Other common examples of signaling include e.g., general purpose input/output (GPIO), dedicated hardware signaling, and/or message based signaling.

In one variant, the second processor may read one or more completion data structures responsive to notification. Upon reading the completion data structure, the second processor may further acknowledge the completion (thereby forming a two-way handshake). In other embodiments, the second processor does not further acknowledge the completion.

In one exemplary embodiment, the second processor is not explicitly notified but determines whether or not a completion is outstanding. In some variants, the second processor can read one or more arrays which identify outstanding completion requests. In other variants, the second processor can read one or more arrays which identify the current record of completion requests, and the second processor determines whether any new completion requests should be serviced. Other common forms of deferred notification include without limitation, e.g., mailboxes, semaphores, and/or other memory based messaging. For example, a first processor may notify the second processor of a completion data in a completion data structure by updating a pointer index to the completion data structure.

In a hybrid embodiment, the second processor may both make its own determinations as well as receive notifications. For example, in one such case, the second processor checks a CR for a new CD at time intervals, whether or not an MSI is generated and received. In some implementations, the time intervals may be static. For example, the interval may be predetermined and checked at regular intervals.

In other implementations, the time intervals may vary. In some cases, the variance in time intervals may be based on one or more processor considerations. In one such implementation, the interval may be dynamically set such that the interval is smaller when there has been a certain number of transactions (a threshold) over a given time period, and larger when the number falls below the above threshold or a different one. In another embodiment, the host processor may check for an update to an index value in similar predetermined or dynamic intervals to see whether a particular TD or TDs were transacted or otherwise completed. More generally, the time intervals may be based on processor load, power consumption, performance requirements, load balancing, and/or any other processor consideration.

In another embodiment, once a host processor determines that the peripheral has completed the data transactions, the host may remove the corresponding one or more TDs. The peripheral processor may then return to step 802 to process the next one or more TDs in queue. In one variant, the additional TDs are immediately subsequent to those processed in the above steps, completing them "in order."

FIG. 9 illustrates an exemplary method 900 for acknowledging by a second processor apparatus, a completion of a data transaction with a first processor apparatus. In one exemplary variant, the signaling is further optimized for completion of groups of data transactions.

At step 902, a second processor apparatus writes one or more data structures for processing. In one exemplary embodiment, the one or more data structures are representative of data to be transacted with another device such as an external peripheral device. In another embodiment, the one or more data structures may be processed or rendered by the first processor apparatus. Various other forms of data transactions and/or data consumption may be substituted by those of ordinary skill in the related arts given the contents of the present disclosure, the foregoing being purely illustrative.

In one exemplary embodiment, one or more transfer descriptors (TDs) are written to a transfer descriptor ring (TR). Writing the TDs to the TR enables another processor to transmit, render, or otherwise consume data based on the TDs. In one exemplary embodiment, the one or more TDs are data structures that are representative of data to be transmitted by the first processor. In the exemplary embodiment, the TR is located in a shared memory that is accessible by both the first and second processors. The data may be accessed by the first processor and transmitted via a baseband modem in communication therewith. In another embodiment, the TR may be located in either the first or the second processor's local buffer.

In some embodiments, the data includes a discrete payload that is intended for consumption at its destination. For example, the payload may be a command for a peripheral device located external to a user equipment. In another example, the payload may be consumable media data, such as audio data to be rendered via e.g., a wireless headset, text to be displayed on a screen, and/or other user interface element. In another example, the payload may be event data for another, third independently operable processor in data communication with the peripheral processor and/or the host processor. Still other types of data and/or their associated uses may be substituted with equivalent success by those of ordinary skill in the related arts, given the contents of the present disclosure.

At step 904, the second processor receives one or more completion data structures that indicate that another processor has completed processing the one or more data structures written in step 902. In one exemplary embodiment, the second processor may receive notifications from the first processor; alternatively, the second processor may check for completions on its own.

For example, the second processor may access a completion descriptor ring (CR) located in the shared memory via a communication link. In another embodiment, the second processor accesses a CR located at a local buffer of the first processor. In another embodiment, the second processor accesses a CR located at a local buffer of either the first or the second processor.

In one implementation, the second processor may receive explicit notification that one or more completion descriptors are outstanding. In other implementations, the second processor may not be explicitly notified, but independently determines (implicitly) whether or not a completion is outstanding. In another implementation, the second processor may both make its own determinations as well as receive notifications.

At step 906, the second processor handles the one or more completions. Various implementations may handle completions differently; for example completion handling may include verification of the completion, memory management, performance control, reporting, statistics collection, acknowledgement, and/or any number of other management tasks.

In one embodiment, the second processor verifies the completion data. Verification may include so-called "sanity" checks (i.e., that the completion data is properly formatted and corresponds to expected values, etc.), checking of permissions and/or other security or privilege based verifications.

In one embodiment, the second processor performs memory management based on the completion data. For example, the second can free up the memory buffers that store the previously written data structures. In some variants, the second processor may additionally update various data structures based therefrom. For example, the second processor can update index values for a data structure. In some cases, the updated index values may additionally trigger further processing by the first processor; e.g., updating a tail pointer index of CR can signify more room in CR to put new completions.

In some embodiments, the second processor can use completion data to control, moderate, and/or correct for performance. For example, an application processor that requires a minimum quality of service (QoS) for a network connection can use completion information (success, failure, etc.) to monitor current performance and ensure that the required QoS is met. Similarly, an application processor performing video playback can use completion information to moderate video playback performance. In some cases, if the completion data indicates that performance is insufficient, the processor can e.g., allocate more resources, use higher coding complexity, apply higher forward error correction, and/or any number of other schemes to compensate for performance loss. Alternatively, if the performance is adequate and there is additional margin, then the processor can redirect resources to other uses and/or reduce error correction overhead.

In still other embodiments, completion data can be collected for diagnostics, performance monitoring, and/or historic data. statistics and analytics can improve overall system performance by improving initial performance estimates and/or parameter selection.

Example Operation—

FIG. 10 illustrates an exemplary method 1000 for verifying the completion of a data transaction between two or more independently operable processors, including a peripheral-side processor that transacts data written by a host-side processor.

At step 1002, the host processor allocates one or more transfer descriptors (TDs) to a transfer descriptor ring (TR). The host processor writes the TDs in order they are to be read by the peripheral processor. The host may write the TDs via a communication link. The TDs represent data to be transacted by the peripheral processor. A TD may point to or reference a sector in an external memory that contains the data. Multiple TDs may be written in batches or may be written one at a time. A TD may also encapsulate the data directly, thereby directly delivering the data to the peripheral that reads the TD.

During operation, the host first determines the size of the data (the payload) to be included in the TD. If the size is below a predetermined threshold, the host may place the data in the TD. Otherwise, the host may write the data to the external memory. The TR may be located in a shared memory between the host processor and the peripheral processor and that is accessible by both processors. In cases where there are numerous TDs to be transacted at once, having multiple TRs of limited size may accommodate the TDs.

At step 1004, the host writes to a head index to update an index value. Specifically, the host updates the value of the index value in a transfer ring head index array (TR HIA). For example, the value of "hi_x" may be set to 1. This initial setting indicates to the peripheral the location of the TDs to which peripheral may read.

The host processor may additionally send a "doorbell" message or a message signaling interrupt (MSI) to indicate to the peripheral processor that TDs are available for processing. Such messages may also indicate the different locations of TDs if the TDs were written to different TRs. It will be appreciated that updating the index value ensures that the peripheral processor reads the TDs in the proper order as intended, i.e., in the order placed in the TR(s).

At steps 1006 and 1008, in response to the host doorbell message, the peripheral processor reads the TDs located in the TR. Thereafter, the peripheral processor processes the data represented by the one or more TDs. For example, the peripheral processor may transmit the data upstream to an access point via the modem, receive data to fill the TD, render graphics, capture media, etc.

At step 1010, the peripheral processor writes one or more completion descriptors (CDs) that correspond to respective ones of the one or more TDs that the peripheral processor has processed and completed. The writing of the CDs in the specific order that the peripheral processor transacted the TDs serves to acknowledge such transaction by the peripheral processor. Each CD may contain information related to the data completed by the peripheral processor. In one embodiment, the completion may point to or complete one or more TDs; in one exemplary variant the optimized completion may complete all outstanding (TDs waiting for completion) up to and including the expressly completed TD.

In the exemplary embodiment, a given CD indicates one or more of (i) the source of the TD (which TR the peripheral read from) and (ii) an identifier of the data, such as a location of the memory (external or otherwise), slot or index in a memory array, an address or range of addresses, etc. For example, a CD may include a TD specific tag to indicate that the peripheral processor has retrieved and completed the TD associated with the tag.

The CDs are written into a CR located in the shared memory between the host and peripheral processors and accessible by both processors. Notably, the TDs were placed in the TR by the host processor in the order intended to be read and were read by the peripheral processor in the same order. Hence, the CDs are written in the order that the TDs were retrieved and completed; more directly, the aforementioned scheme provides "in-order" completion.

At step 1012, the peripheral processor updates the status of the TR by updating one or more index values. In one embodiment, the completion ring head index array (CR HIA) includes an index value previously set by the peripheral. After the peripheral processor queues one or more CDs in the CR, the peripheral processor updates the index value of the CR HIA. For example, the peripheral processor may write to a head index array (e.g., CR HIA) to update the value of "hi_a" to indicate to the host that a new CD is available at CR. Moreover, the peripheral processor may write to a tail index array (e.g., TR TIA) to update an index value to indicate the completion of the TD(s).

The peripheral processor may further send a "doorbell" message or a MSI to indicate to the host processor that the TD(s) were completed. The message may be a signal that tells the host processor to check the CD(s) that the peripheral processor wrote in the CR.

Multiple index values may be updated. In some cases, portions of the data or payloads are located across multiple TRs (located in other shared memory, buffers, etc.). In the case where multiple TDs are processed from the same TR, only one index value need be updated since there is only one TR to keep track of. In variants in which multiple CRs are involved (each CR corresponding to each TR that the peripheral processor read, or each CR corresponding to one or more TRs), the message (e.g., doorbell, MSI) may indicate different locations of the CDs. In such variants, the peripheral processor may have written the CDs in different CRs according to the location of the corresponding TR from which the TDs were read.

The message may occur after each CD is written to ensure the in-order delivery of the completion acknowledgement. In one optimization, the message may occur after a batch of CDs are written so as to minimize the time amount of time until the next TD(s) are read or next CD(s) are written by the peripheral. This is particularly advantageous in certain implementations in which TD or CD transactions only occur after the host processor acknowledges the completion of previous TDs, further discussed below.

In step 1014, the host processor reads the CD(s) to verify the completion of the one or more TDs written by the host processor in step 1002. In one embodiment, the host may read the CD(s) in response to the aforementioned message (e.g., MSI or doorbell) and/or in response to an update in the index value in a head index array (e.g., CR HIA). In addition, the CD(s) may be removed after the host processor reads them. The host processor may also write to a tail index array (e.g., CR TIA) to update an index value to indicate that the host processor has processed the CD(s) and thus verified the completion of the TD transaction.

In the exemplary embodiment, the host processor verifies the completion as acknowledged by the peripheral processor (and indicated by the mechanisms discussed above). Further, the host processor may remove the data and/or TD(s) that were completed by the peripheral processor, as indicated by the CD(s).

In addition, as described above with respect to steps 1002 and 1004, the host processor may write new TD(s) to the TR in next available space, e.g., the next open slot in the TR. In some variants, the host processor further writes to a head index array (e.g., TR HIA) to update an index value to indicate next available TD. In other variants, the host processor sends a message to the peripheral processor.

While the foregoing description is presented within the context of a packet-based protocol, those of ordinary skill in the related arts will readily appreciate that non-packet-based protocols may be substituted with equivalent success, given the contents of the present disclosure. For example, in some cases data or payload may be transferred via a circuit-switch or other dedicated signaling protocol. Such connectivity may include, e.g., general purpose input output (GPIO), I2C, I2S, and/or any number of other dedicated bus protocols.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method of acknowledging a completion of a transaction of data via an inter-processor communication (IPC) link between a first independently operable processor apparatus and a second independently operable processor apparatus, the method comprising:
    reading, by the second independently operable processor apparatus, a first data structure representative of the data, wherein the first data structure is written by the first independently operable processor apparatus to a first data array located in a shared memory structure;
    retrieving the data from the shared memory structure based at least on the reading of the first data structure from the first data array, wherein the retrieved data corresponds to the first data structure;
    transmitting the retrieved data corresponding to the first data structure via an apparatus associated with the second independently operable processor apparatus;
    subsequent to the transmitting of the data, writing, by the second independently operable processor apparatus, a second data structure to a second data array located in the shared memory structure, wherein the second data structure comprises information associated with the transmitting of the data and being readable by the first independently operable processor apparatus, thereby optimizing signaling of the completion of the transaction of data between the first and second independently operable processor apparatus, wherein the signaling of the completion comprises enabling the first independently operable processor apparatus to check for the second data structure at a time interval that is dynamically altered to be smaller or larger based at least on (i) a number of transactions, and (ii) a threshold number of transactions; and
    causing the first independently operable processor apparatus to read the second data structure from the second data array.

2. The method of claim 1, wherein the second data structure comprises information associated with a group of data transactions.

3. The method of claim 2, wherein the group of data transactions are sequentially ordered.

4. The method of claim 3, wherein the information associated with the group of data transactions comprises an explicit completion status for only one data transaction.

5. The method of claim 4, wherein the explicit completion status for only one data transaction is distributed to at least one prior sequentially ordered data transaction.

6. The method of claim 1, wherein the writing information associated with processing of the retrieved data comprises one or more of a success, failure, timeout, or indeterminate status.

7. The method of claim 1, wherein the reading, by the second independently operable processor apparatus, the first data structure representative of the data comprises reading a series of data structures from the shared memory structure; and
    wherein the writing, by the second independently operable processor apparatus, comprises writing to the shared memory structure a corresponding series of data structures according to an ordered sequence corresponding to the series of data structures.

8. A user device comprising:
    a first processor apparatus and a second processor apparatus;
    a shared memory structure comprising a first data array structure and a second data array structure; and
    a non-transitory computer-readable apparatus comprising a storage medium having a computer program stored thereon, the computer program comprising instructions configured to, when executed, cause the second processor apparatus to:
        read a plurality of first data structures from the first data array structure of the shared memory structure, wherein the plurality of first data structures is written by the first processor apparatus;
        transmit one or more payloads corresponding to the plurality of first data structures to another device in wireless data communication with the user device in an order based on a sequence of the plurality of first data structures;
        subsequent to the transmission of the one or more payloads to the another device, write to the second data array structure of the shared memory structure a plurality of second data structures corresponding to the plurality of first data structures in the order based on the sequence, the plurality of second data structures indicative of a completion status corresponding to transfer of the one or more payloads between the first and second processor apparatus, the writing of the plurality of second data structures enabling signaling of completion of the transfer between the first and second processor apparatus;
    wherein the signaling of completion comprising detection of presence of at least one of the written plurality of second data structures by the first processor apparatus at a dynamically determined time interval, the time interval being contracted or expanded based at least on evaluation of a number of transfers relative to a threshold number of transfers.

9. The user device of claim 8, wherein a single completion status corresponds to multiple payload transactions.

10. The user device of claim 9, wherein the single completion status identifies a single payload transaction explicitly.

11. The user device of claim 10, wherein the single completion status implicitly includes at least one other payload transaction status.

12. The user device of claim 8, wherein the instructions are further configured to, when executed, cause the second processor apparatus to:
    cause the first processor apparatus to remove at least one of the plurality of first data structures from the first data array structure based on the plurality of second data structures indicative of the completion status corresponding to the at least one of the plurality of first data structures.

13. The user device of claim 8, wherein the instructions are further configured to, when executed, cause the second processor apparatus to:
    responsive to retrieval of the one or more payloads, update a first index value indicative to the first processor apparatus of a presence of the plurality of second data structures; and
    responsive to the transaction of the payloads, update a second index value indicative to the first processor apparatus of the completion of the transaction of the payloads.

14. A system configured to enable verification of a data transaction over an inter-processor communication (IPC) link between two or more independently operable processors, the system comprising:
    a shared memory structure comprising a transfer descriptor ring and a completion descriptor ring, the shared memory structure being accessible to a first processor apparatus and second processor apparatus via the IPC link;

wherein the first processor apparatus is configured to:
- write one or more transfer descriptors to the transfer descriptor ring of the shared memory structure, the transfer descriptor being descriptive of data to be transmitted by the second processor apparatus; and
- in response to transmission of the data described by the transfer descriptor, via the second processor apparatus, read one or more completion descriptors, and acknowledge the processing of the data by the second processor apparatus, wherein the read of the one or more completion descriptors occurs according to a dynamically set time interval, the time interval being increased or decreased based at least on a quantity of data transmissions respectively exceeding or falling below a threshold over a given time period; and wherein the second processor apparatus is configured to:
- retrieve the data to be transmitted, the data to be transmitted being described by the transfer descriptor, based on information read from the one or more transfer descriptors from the transfer descriptor ring of the shared memory structure; and
- in response to the transaction of the data described by the transfer descriptor, write the one or more completion descriptors to be read by the first processor apparatus to the completion descriptor ring of the shared memory structure, the writing of the one or more completion descriptors enabling verification of completion of the data transaction between the first and second processor apparatus.

15. The system of claim 14, wherein the second processor apparatus is further configured to process the retrieved data in a sequence dictated by the one or more transfer descriptors.

16. The system of claim 14, wherein the first processor apparatus is further configured to write one or more new transfer descriptors to the transfer descriptor ring upon the acknowledgment of the processing of the data by the second processor apparatus.

17. The system of claim 16, wherein:
- the first processor apparatus is further configured to update a first index value upon the reading of the one or more completion descriptors, or the writing of the new one or more transfer descriptors; and
- the second processor apparatus is further configured to update a second index value upon reading of the one or more transfer descriptors, or the writing of the one or more completion descriptors.

18. The system of claim 17, wherein the second processor apparatus is further configured to check for the update to the first index value based on a likelihood of receiving a signal from the first processor apparatus.

19. The system of claim 14, wherein:
- the second processor is further configured to transmit the data only upon receiving a message from the first processor.

20. The system of claim 14, wherein:
- the first processor apparatus comprises an application processor;
- the second processor apparatus comprises a baseband processor;
- the baseband processor is configured to be in data communication with an air interface associated with a modem configured to be in data communication with a peripheral device;
- the processing of the data comprises a data transaction for the modem of the peripheral device.

* * * * *